United States Patent [19]

Simor

[11] Patent Number: 5,060,150
[45] Date of Patent: Oct. 22, 1991

[54] PROCESS CREATION AND TERMINATION MONITORS FOR USE IN A DISTRIBUTED MESSAGE-BASED OPERATING SYSTEM

[75] Inventor: Gabor Simor, Barrington, Ill.

[73] Assignee: Motorola, Inc., Schaumburg, Ill.

[21] Appl. No.: 649,247

[22] Filed: Jan. 31, 1991

Related U.S. Application Data

[63] Continuation of Ser. No. 476,115, Jan. 29, 1990, abandoned, which is a continuation of Ser. No. 336,630, Apr. 7, 1989, abandoned, which is a continuation of Ser. No. 624, Jan. 5, 1987, abandoned.

[51] Int. Cl.⁵ ............................................. G06F 13/00
[52] U.S. Cl. ................................... 364/200; 364/284; 364/284.3; 364/280; 364/280.6; 364/264
[58] Field of Search ... 364/200 MS File, 900 MS File

[56] References Cited

U.S. PATENT DOCUMENTS

| | | | |
|---|---|---|---|
| 4,007,450 | 2/1977 | Haibt et al. | 364/200 |
| 4,031,512 | 6/1977 | Fabor | 364/200 |
| 4,084,224 | 4/1978 | Appell et al. | 364/200 |
| 4,320,451 | 3/1982 | Bachman et al. | 364/200 |
| 4,325,120 | 4/1982 | Colley et al. | 364/200 |
| 4,363,093 | 12/1982 | Davis et al. | 364/200 |
| 4,394,725 | 7/1983 | Bienvenu et al. | 364/200 |
| 4,395,757 | 7/1983 | Bienvenu et al. | 364/200 |
| 4,413,318 | 11/1983 | Herrington | 364/200 |
| 4,447,874 | 5/1984 | Bradley et al. | 364/200 |
| 4,586,134 | 4/1986 | Norstedt | 364/200 |
| 4,630,196 | 12/1986 | Bednar, Jr. et al. | 364/200 |
| 4,635,189 | 1/1987 | Kendall | 364/200 |
| 4,644,468 | 2/1987 | Doster et al. | 364/200 |
| 4,644,470 | 2/1987 | Feigenbaum et al. | 364/200 |
| 4,649,473 | 3/1987 | Hammer et al. | 364/200 |
| 4,665,520 | 5/1987 | Strom et al. | 364/200 |
| 4,677,588 | 6/1987 | Benjamin et al. | 364/900 |
| 4,694,396 | 9/1987 | Weisshaar et al. | 364/200 |
| 4,718,005 | 1/1988 | Feigenbaum et al. | 364/200 |
| 4,754,395 | 6/1988 | Weisshaar et al. | 364/200 |
| 4,780,821 | 10/1988 | Crossley | 364/200 |
| 4,819,150 | 4/1989 | Jennings et al. | 364/200 |
| 4,835,685 | 5/1989 | Kun | 364/200 |
| 4,885,682 | 12/1989 | Komoto | 364/200 |

OTHER PUBLICATIONS

Ralston, Anthony et al., *Encyclopedia of Computer Science and Engineering*, Second edition, 1983, pp. 1534–1535.

Sams, J. G., "Node Processor for Distributed System Control", IBM Technical Disclosure Bulletin, vol. 25, No. 5, Oct. 1980, pp. 1811–1812.

Summer, R. C. et al., "Message-Based Protocol for Interprocessor Communication," IBM Technical Disclosure Bulletin, vol. 23, No. 7, Dec. 1979, pp. 2893–2895.

*Primary Examiner*—Kevin A. Kriess
*Attorney, Agent, or Firm*—Walter W. Nielsen; Raymond J. Warren

[57] ABSTRACT

A distributed data processing system is provided comprising a plurality of processes which communicate with one another using messages. When a process is created or terminated anywhere in the system a notification message may be requested. Such requests may be made regarding different organizational levels of the system, for example the entire system, one node, or a group of related processes.

25 Claims, 14 Drawing Sheets

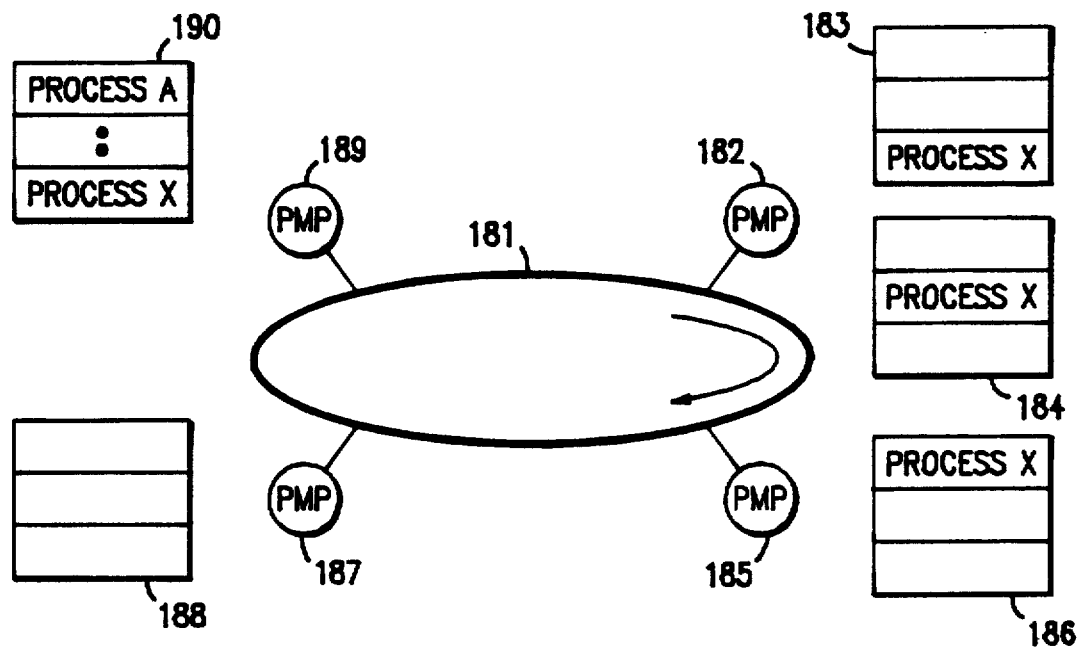
FIG. 10
FIG. 11
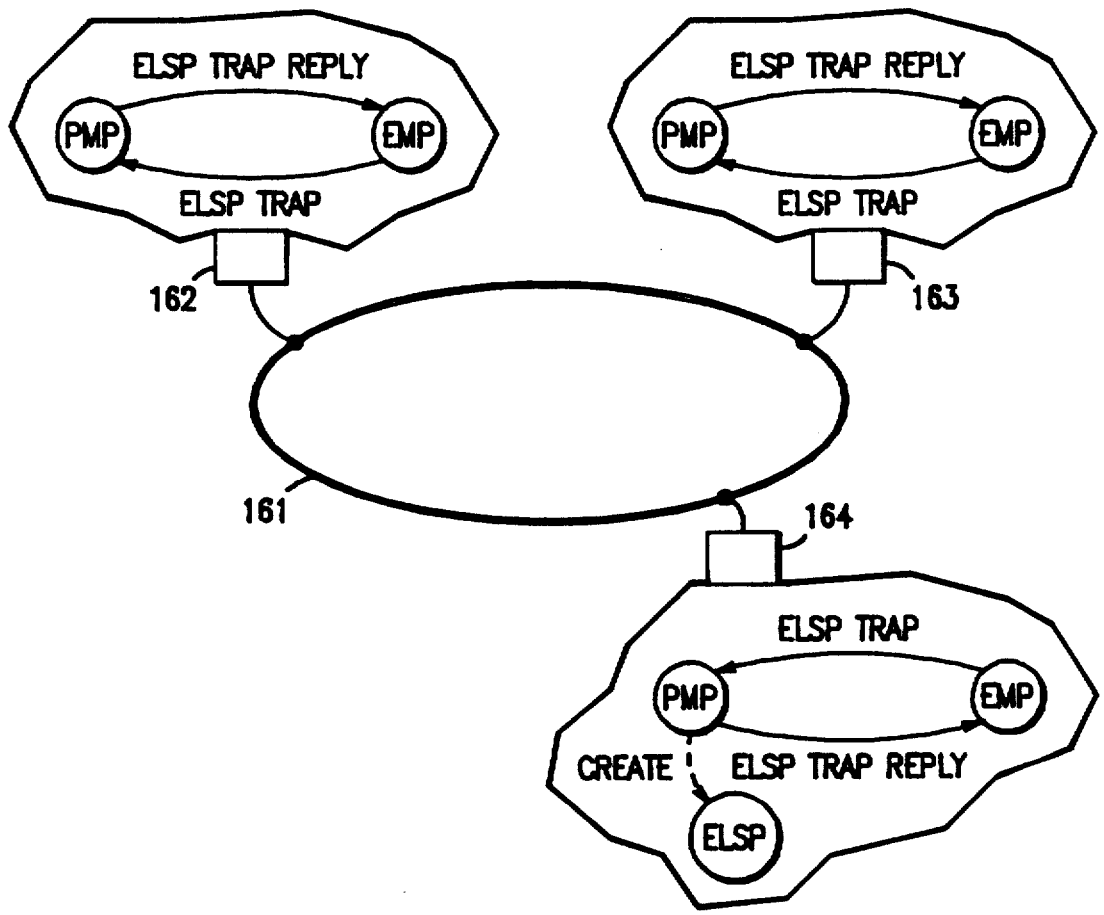

PROCESS CREATION AND TERMINATION MONITORS FOR USE IN A DISTRIBUTED MESSAGE-BASED OPERATING SYSTEM

This application is a continuation of prior application Ser. No. 07/476,115, filed Jan. 29, 1990, which was a continuation of prior application Ser. No. 07/336,630, filed Apr. 7, 1989, which was a continuation of prior application Ser. No. 07/000,634, filed on Jan. 5, 1987, now all.

RELATED INVENTIONS

The present invention is related to the following inventions, all filed on May 6, 1985, and all assigned to the assignee of the present invention:

1. Title: Nested Contexts in a Virtual Single Machine
   Inventors: Andrew Kun, Frank Kolnick, Bruce Mansfield
   Ser. No.: 07/270,437 filed Nov. 7, 1988, a continuation of Ser. No. 739,903 (now abandoned)
2. Title: Computer System With Data Residence Transparency and Data Access Transparency
   Inventors: Andrew Kun, Frank Kolnick, Bruce Mansfield
   Ser. No.: 07/300,697 filed Jan. 19, 1989, a continuation of Ser. No. 110,614 (now abandoned) which was a continuation of Ser. No. 730,929 (now abandoned)
3. Title: Network Interface Module With Minimized Data Paths
   Inventors: Bernhard Weisshaar, Michael Barnea
   Ser. No.: 730,621, now U.S. Pat. No. 4,754,395
4. Title: Method of Inter-Process Communication in a Distributed Data Processing System
   Inventors: Bernhard Weisshaar, Andrew Kun, Frank Kolnick, Bruce Mansfield
   Ser. No.: 730,892, now U.S. Pat. No. 4,694,396
5. Title: Logical Ring in a Virtual Single Machine
   Inventor: Andrew Kun, Frank Kolnick, Bruce Mansfield
   Ser. No.: 730,923 (now abandoned) and Ser. No. 183,469, filed Apr. 15, 1988 (continuation)
6. Title: Virtual Single Machine With Message-Like Hardware Interrupts and Processor Exceptions
   Inventors: Andrew Kun, Frank Kolnick, Bruce Mansfield
   Ser. No.: 730,922

The present invention is also related to the following inventions, all filed on even date herewith, and all assigned to the assignee of the present invention:

7. Title: Computer Human Interface Comprising User-Adjustable Window for Displaying or Printing Information
   Inventor: Frank Kolnick
   Ser. No.: 07/335,092 filed May 17, 1989, a continuation of Ser. No. 000,625 (now abandoned)
8. Title: Computer Human Interface With Multi-Application Display
   Inventor: Frank Kolnick
   Ser. No.: 000,620
9. Title: Object-Oriented Software Architecture Supporting Input/Output Device Independence
   Inventor: Frank Kolnick
   Ser. No.: 07/361,738 filed June 2, 1989, a continuation of Ser. No. 000,619 (now abandoned)
10. Title: Self-Configuration of Nodes in a Distributed Message-Based Operating System
    Inventors: Gabor Simor
    Ser. No.: 000,621
11. Title: Computer Human Interface With Multiple Independent Active Pictures and Windows
    Inventors: Frank Kolnick
    Ser. No.: 07/274,674 filed Nov. 21, 1988, a continuation of Ser. No. 000,626 (now abandoned)

TECHNICAL FIELD

This invention relates generally to digital data processing, and, in particular, to an operating system in which a notification message may be requested whenever a specified process is created or terminated.

BACKGROUND OF THE INVENTION

The present invention is implemented in a distributed data processing system—that is, two or more data processing systems which are capable of functioning independently but which are so coupled as to send and receive messages to and from one another.

Local Area Network (LAN) is an example of a distributed data processing system. A typical LAN comprises a number of autonomous data processing "nodes", each comprising at least a processor and memory. Each node is capable of conducting data processing operations independently. In addition, each node is coupled (by appropriate means such as a twisted wire pair, coaxial cable, fiber optic cable, etc.) to a network of other nodes which may be, for example, a loop, star, tree, etc., depending upon the design considerations.

As mentioned above, the present invention finds utility in such a distributed data processing system, since there is a need in such a system for processes which are executing or which are to be executed in the individual nodes to share data and to communicate data among themselves.

A "process", as used within the present invention, is defined as a self-contained package of data and executable procedures which operate on that data, comparable to a "task" in other known systems. Within the present invention a process can be thought of as comparable to a subroutine in terms of size, complexity, and the way it is used. The difference between processes and subroutines is that processes can be created and destroyed dynamically and can execute concurrently with their creator and other "subroutines".

Within a process, as used in the present invention, the data is totally private and cannot be accessed from the outside, i.e., by other processes. Processes can therefore be used to implement "objects", "modules", or other higher-level data abstractions. Each process executes sequentially. Concurrency is achieved through multiple processes, possibly executing on multiple processors.

Every process in the distributed data processing system of the present invention has a unique identifier (PID) by which it can be referenced. The PID is assigned by the system when the process is created, and it is used by the system to physically locate the process.

Every process also has a non-unique, symbolic "name", which is a variable-length string of characters. In general, the name of a process is known system-wide. To restrict the scope of names, the present invention utilizes the concept of a "context".

A "context" is simply a collection of related processes whose names are not known outside of the context. Contexts partition the name space into smaller, more manageable subsystems. They also "hide" names, ensuring that processes contained in them do not unintentionally conflict with those in other contexts.

A process in one context cannot explicitly communicate with, and does not know about, processes inside other contexts. All interaction across context boundaries must be through a "context process", thus providing a degree of security. The context process often acts as a switchboard for incoming messages, rerouting them to the appropriate sub-processes in its context.

A context process behaves like any other process and additionally has the property that any processes which it creates are known only to itself and to each other. Creation of the process constitutes definition of a new context with the same name as the process.

Any process can create context processes. Each new context thus defined is completely contained inside the context in which it was created and therefore is shielded from outside reference. This "nesting" allows the name space to be structured hierarchically to any desired depth.

Conceptually, the highest level in the hierarchy is the system itself, which encompasses all contexts. Nesting is used in top-down design to break a system into components or "layers", where each layer is more detailed than the preceding one. This is analogous to breaking a task down into subroutines, and in fact many applications which are single tasks on known systems may translate to multiple processes in nested contexts.

A "message" is a buffer containing data which tells a process what to do and/or supplies it with information it needs to carry out its operation. Each message buffer can have a different length (up to 64 kilobytes). By convention, the first field in the message buffer defines the type of message (e.g., "read", "print", "status", "event", etc.).

Messages are queued from one process to another by name or PID. Queuing avoids potential synchronization problems and is used instead of semaphores, monitors, etc. The sender of a message is free to continue after the message is sent. When the receiver attempts to get a message, it will be suspended until one arrives if none are already waiting in its queue. Optionally, the sender can specify that it wants to wait for a reply and is suspended until that specific message arrives. Messages from any other source are not dequeued until after that happens.

Within the present invention, messages are the only way for two processes to exchange data. There is no concept of a "global variable". Shared memory areas are not allowed, other than through processes which essentially "manage" each area by means of messages. Messages are also the only form of dynamic memory that the system handles. A request to allocate memory therefore returns a block of memory which can be used locally by the process but can also be transmitted to another process.

Messages provide the mechanism by which hardware transparency is achieved. A process located anywhere in the system may send a message to any other process anywhere else in the system (even on another processor) if it knows the process name. This means that processes can be dynamically distributed across the system at any time to gain optimal throughput without changing the processes which reference them. Resolution of destinations is done by searching the process name space.

The context nesting level determines the "scope of reference" when sending messages between processes by name. From a given process, a message may be sent to all processes at its own level (i.e., in the same context) and (optionally) to any arbitrary higher level. The contexts are searched from the current context upward until a match is found. All processes with the given name at that level are then sent a copy of the message. A process may also send a message to itself or to its parent (the context process) without knowing either name explicitly, permitting multiple instances of a process to exist in different contexts, with different names.

Sending messages by PID obviates the need for a name search and ignores context boundaries. This is the most efficient method of communicating.

In known data processing systems a process control block (PCB) is used to describe various attributes and the status of processes, including the status of resources used by the processes. Examples of such resources are files, data storage devices, I/O devices, ports, etc.

The operating system of the present invention utilizes PCB's too, but they do not have to keep track of the status of processes or resources used by the processes, thus enabling the system to be more modular and reconfigurable.

However, it is still desirable to provide the capability of monitoring the status of processes within the operating system of the present invention, and in particular the fact that a process has been created or terminated.

There is a significant need to be able to provide within a data processing operating system the ability for a process to request to be notified when a designated process has been created and/or terminated. In addition, there is a need for such notification to occur within several organization levels, such as one context of processes, one node, or an entire network.

Further, there is a need to be able to request suspension of the process in addition to notification of the creation of or termination of the process.

BRIEF SUMMARY OF INVENTION

Accordingly, it is an object of the present invention to provide a data processing system having an improved operating system.

It is also an object of the present invention to provide an improved data processing system having an operating system which allows a process to request notification when a particular process has been created and/or terminated within a designated portion of the data processing system.

It is another object of the present invention to provide a distributed data processing system having an operating system which allows a first process on one node to request notification when a second process on the same or different node has been created and/or terminated.

It is yet another object of the present invention to provide a distributed data processing system having an operating system in which notification is generated to requesting processes located in a plurality of nodes if and when a particular process has been created and/or terminated.

It is still another object of the present invention to provide a distributed data processing system having an operating system in which a process manager process may set a process creation monitor and/or a process termination monitor regarding the creation and/or termination of an identified process.

It is a further object of the present invention to provide a distributed data processing system having an operating system in which a process manager process may set a process creation monitor and/or a process termination monitor regarding the creation and/or termination of an identified process only upon certain conditions.

It is another object of the present invention to provide a distributed data processing system having an operating system in which a process manager process may be requested to release a process creation monitor and/or a process termination trap.

It is still another object of the present invention to provide a distributed data processing system having an operating system in which a process manager process may be requested to release or not to release automatically a process creation/termination monitor after the first identified process has been created/terminated.

These and other objects are achieved in accordance with a preferred embodiment of the invention by providing, in a distributed data processing system comprising a plurality of interconnected nodes, the system comprising a plurality of processes, the processes communicating with one another by means of messages, a method of providing a notification message when a process is created on one of the nodes, the method comprising the steps of a) providing a process manager process on such one node, and b) providing a request to the process manager process to generate a notification message whenever a process is created on such one node.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

FIG. 10 shows a distributed data processing system illustrating how Process Manager Processes are notified when a Process Creation Monitor is resolved at a remote node.

FIG. 11 illustrates how the present invention may be used in an error management module in a distributed data processing system in which each system node has an Event Log Service Process (ELSP).

OVERVIEW OF COMPUTER SYSTEM

Figure 1:
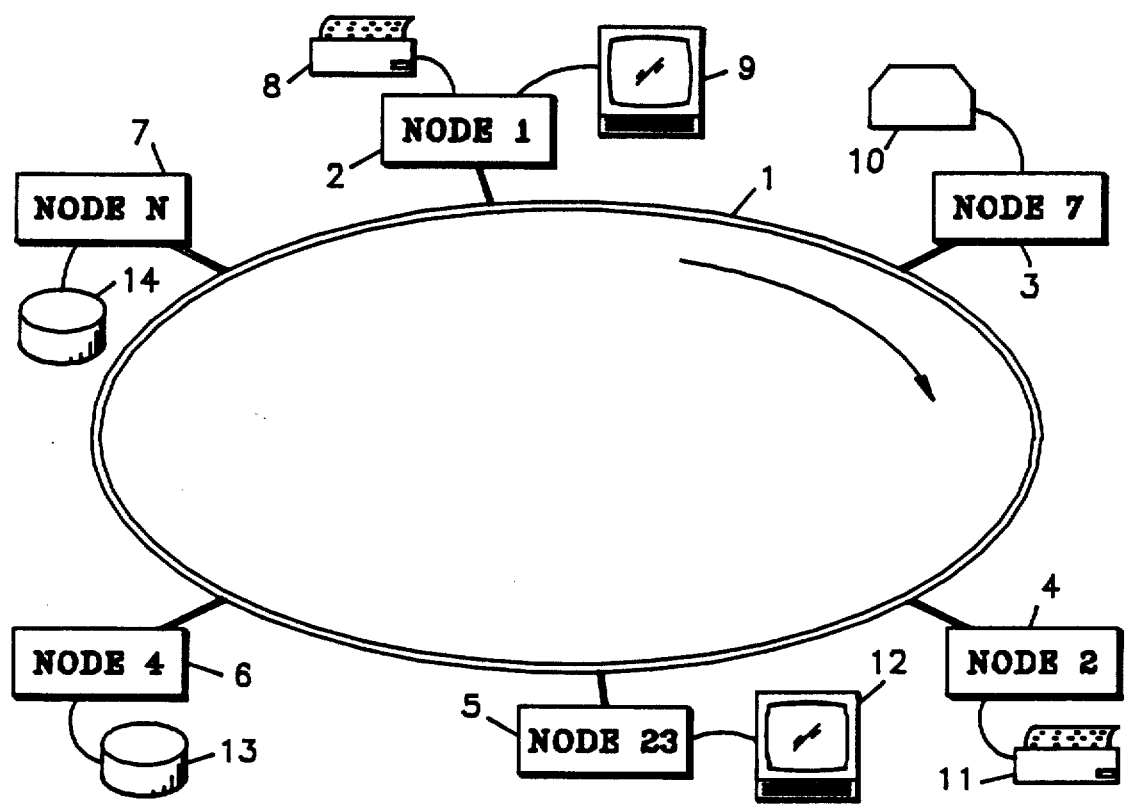
FIG. 1 shows a representational illustration of a single network, distributed message-based data processing system of the type incorporating the present invention.

With reference to FIG. 1, a distributed computer configuration is shown comprising multiple nodes 2-7 (nodes) loosely coupled by a local area network (LAN) 1. The number of nodes which may be connected to the network is arbitrary and depends upon the user application. Each node comprises at least a processor and memory, as will be discussed in greater detail with reference to FIG. 2 below. In addition, each node may also include other units, such as a printer 8, operator display module (ODM) 9, mass memory module 13, and other I/O device 10.

Figure 2:
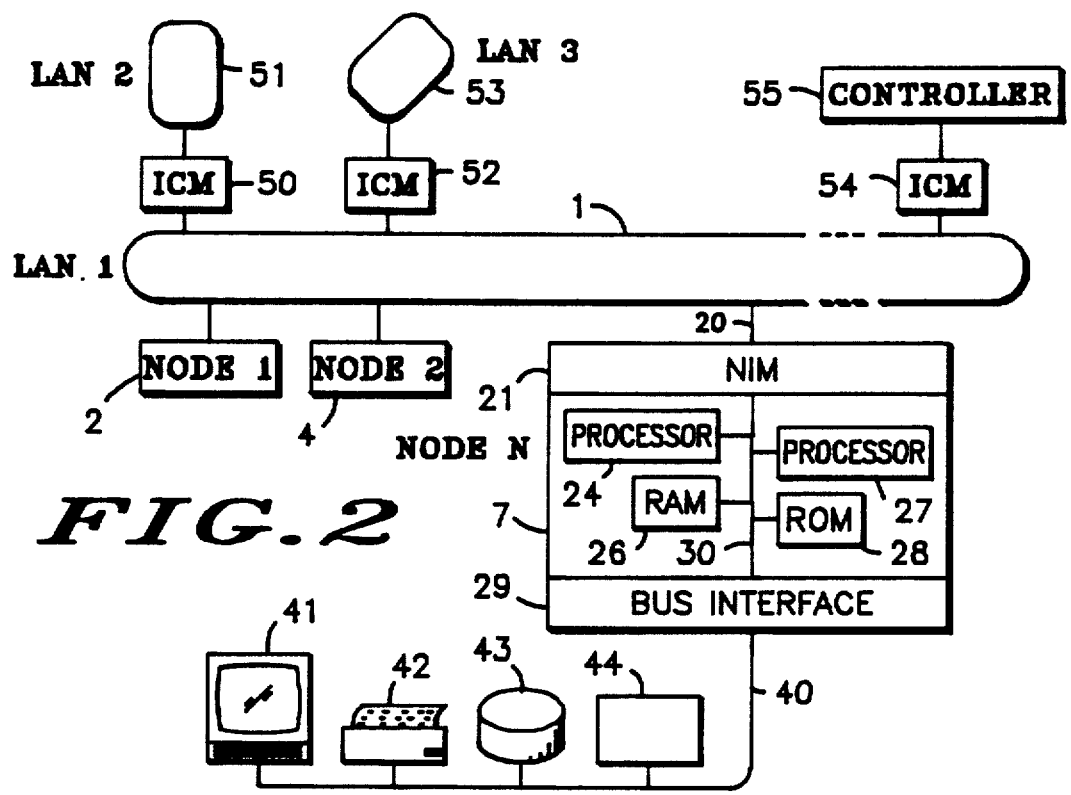
FIG. 2 shows a block diagram illustrating a multiple-network, distributed message-based data processing system of the type incorporating the present invention.

With reference now to FIG. 2, a multiple-network distributed computer configuration is shown. A first local area network LAN 1 comprises several nodes 2,4 and 7. LAN 1 is coupled to a second local area network 51 (LAN 2) by means of an Intelligent Communications Module (ICM) 50. The Intelligent Communications Module provides a link between the LAN and other networks and/or remote processors (such as programmable controllers).

LAN 2 may comprise several nodes (not shown) and may operate under the same LAN protocol as that of the present invention, or it may operate under any of several commercially available protocols, such as Ethernet; MAP, the Manufacturing Automation Protocol of General Motors Corp.; Systems Network Architecture (SNA) of International Business Machines, Inc.; SECS-II; etc. Each ICM 50 is programmable for carrying out one of the above-mentioned specific protocols. In addition, the basic processing module of the node itself can be used as an intelligent peripheral controller (IPC) for specialized devices.

LAN 1 is additionally coupled to a third local area network 53 (LAN 2) via ICM 52. A process controller 55 is also coupled to LAN 1 via ICM 54.

A representative node N (7, FIG. 2) comprises a processor 24 which, in a preferred embodiment, is a processor from the Motorola 68000 family of processors. Each node further includes a read only memory (ROM) 28 and a random access memory (RAM) 26. In addition, each node includes a Network Interface Module (NIM) 21, which connects the node to the LAN, and a Bus Interface 29, which couples the node to additional devices within a node.

While a minimal node is capable of supporting two peripheral devices, such as an Operator Display Module (ODM) 41 and an I/O Module 44, additional devices (including additional processors, such as processor 27) can be provided within a node. Other additional devices may comprise, for example, a printer 42, and a mass-storage module 43 which supports a hard disk and a back-up device (floppy disk or streaming tape drive).

The Operator Display Module 41 provides a keyboard and screen to enable an operator to input information and receive visual information.

While a single node may comprise all of the above units, in the typical user application individual nodes will normally be dedicated to specialized functions. For example, one or more mass storage nodes may be set up to function as data base servers. There may also be several operator consoles and at least one node for generating hard-copy printed output. Either these same nodes, or separate dedicated nodes, may execute particular application programs.

The system is particularly designed to provide an integrated solution for factory automation, data acquisition, and other real-time applications. As such, it includes a full complement of services, such as a graphical output, windows, menus, icons, dynamic displays, electronic mail, event recording, and file management. Software development features include compilers, a window-oriented editor, a debugger, and performance-monitoring tools.

Local Area Network

The local area network, as depicted in either FIG. 1 or FIG. 2, ties the entire system together and makes possible the distributed virtual machine model described below. The LAN provides high throughput, guaranteed response, reliability, and low entry cost. The LAN is also autonomous, in the sense that all system and applications software is unaware of its existence. For example, any Network Interface Module (e.g. NIM 21, FIG. 2) could be replaced without rewriting any software other than that which directly drives it.

The LAN interconnection medium may be twisted-pair or coaxial cable. Two channels (logically, two distinct networks) may be provided for reliability and for increased throughput.

The LAN architecture is a logical ring, in which an electronic "token" is constantly passed from node to node at high speed. The current holder of the token may use it to send a "frame" of data or may pass it on to the next node in the ring. The NIM only needs to know the logical address and status of its immediately succeeding neighbor. The NIM's responsibility is limited to detecting the failure of that neighbor or the inclusion of a new neighbor. In general, adjustment to failed or newly added nodes is automatic.

The network interface maps directly into the processor's memory. Data exchange occurs through a dual-ported buffer pool which contains a linked list of pending "frames". Logical messages, which vary in length, are broken into fixed-size frames for transmission and are re-assembledby the receiving NIM. Frames are sequence-numbered for this purpose. If a frame is not acknowledged within a short period of time, it is re-transmitted a number of times before being treated as a failure.

As described above with reference to FIG. 2, the LAN may be connected to other LAN's operating under the same LAN protocol via so-called "bridge-ways", or it may be connected to other types of LAN's via "gateways".

Software Model

The computer operating system of the present invention operates upon processes, messages, and contexts, as such terms are defined herein. Thus this operating system offers the programmer a hardware abstraction, rather than a data or control abstraction.

Processes are referenced without regard to their physical location via a small set of message-passing primitives. As mentioned earlier, every process has both a unique system-generated identifier and a not necessarily unique name assigned by the programmer. The identifier provides quick direct access, while the name has a limited scope and provides symbolic, indirect access.

Figure 3:
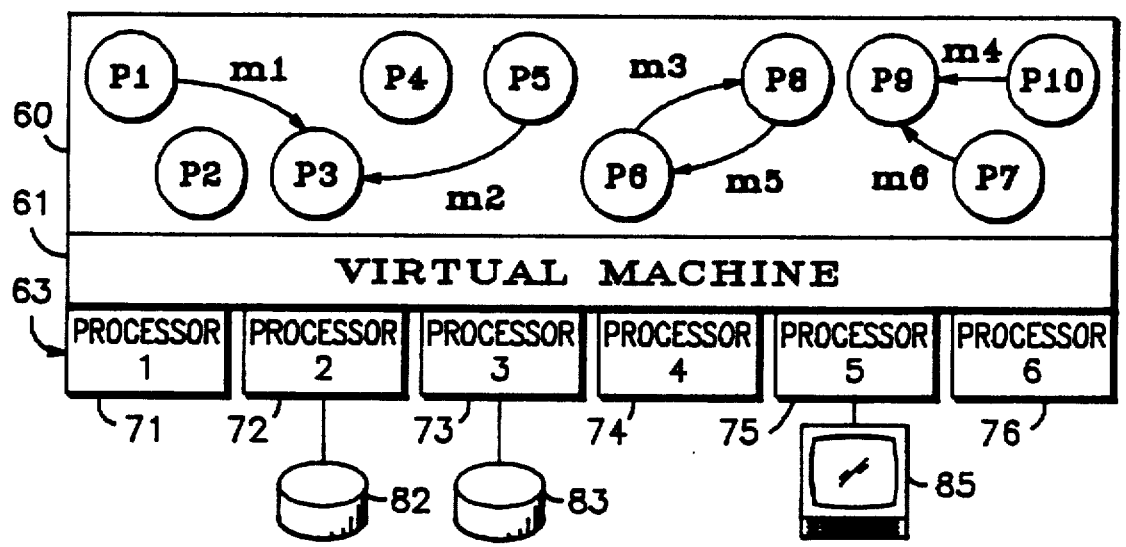
FIG. 3 shows an architectural model of a data processing system of the type incorporating the present invention.

With reference to FIG. 3, an architectural model of the present invention is shown. The bottom, or hardware, layer 63 comprises a number of processors 71-76, as described above. The processors 71-76 may exist physically within one or more nodes. The top, or software, layer 60 illustrates a number of processes P1-P10 which send messages m1-m6 to each other. The middle layer 61, labelled "virtual machine", isolates the hardware from the software, and it allows programs to be written as if they were going to be executed on a single processor. Conversely, programs can be distributed across multiple processors without having been explicitly designed for that purpose.

The Virtual Machine

As discussed earlier, a "process" is a self-contained package of data and executable procedures which operate on that data. The data is totally private and cannot be accessed by other processes. There is no concept of shared memory within the present invention. Execution of a process is strictly sequential. Multiple processes execute concurrently and must be scheduled by the operating system. The processes can be re-entrant, in which case only one copy of the code is loaded even if multiple instances are active.

Every process has a unique "process identifier number" (PID) by which it can be referenced. The PID is assigned by the system when the process is created and remains in effect until the process terminates. The PID assignment contains a randomizing factor which guarantees that the PID will not be re-used in the near future. The contents of the PID are irrelevant to the programmer but are used by the virtual machine to physically locate the process. A PID may be thought of as a "pointer" to a process.

Every process also has a "name" which is a variable-length string of characters assigned by the programmer. A name need not be unique, and this ambiguity may be used to add new services transparently and to aid in fault-tolerance.

Figure 4:
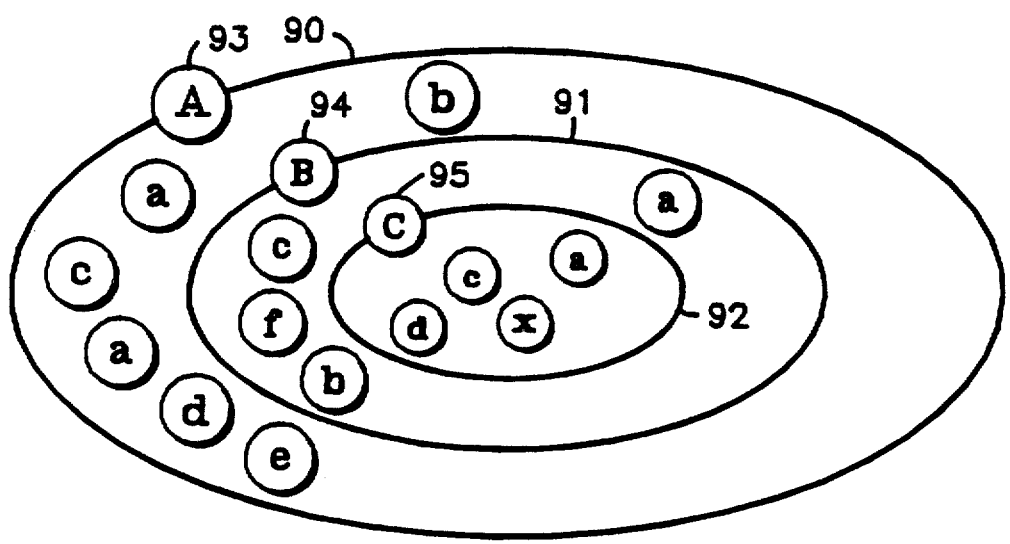
FIG. 4 shows the relationship between software contexts and processes as they relate to the present invention.

FIG. 4 illustrates that the system-wide name space is partitioned into distinct subsets by means of "contexts" identified by reference numerals 90-92. A context is simply a collection of related processes whose names are not known outside of the context. Context 90, for example, contains processes A, a, a, b, c, d, and e. Context 91 contains processes B, a, b, c, and f. And context 92 contains processes C, a, c, d, and x.

One particular process in each context, called the "context process", is known both within the context and within the immediately enclosing one (referred to as its "parent context"). In the example illustrated in FIG. 4, processes A-C are context processes for contexts 90-92, respectively. The parent context of context 91 is context 90, and the parent context of context 92 is context 91. Conceptually, the context process is located on the boundary of the context and acts as a gate into it.

Processes inside context 92 can reference any processes inside contexts 90 and 91 by name. However, processes in context 91 can only access processes in context 92 by going through the context process C. Processes in context 90 can only access processes in context 92 by going through context processes B and C.

The function of the context process is to filter incoming messages and either reject them or reroute them to other processes in its context. Contexts may be nested, allowing a hierarchy of abstractions to be constructed. A context must reside completely on one node. The entire system is treated as an all-encompassing context which is always present and which is the highest level in the hierarchy. In essence, contexts define localized protection domains and greatly reduce the chances of unintentional naming conflicts.

If appropriate, a process inside one context can be "connected" to one inside another context by exchanging PID's, once contact has been established through one or the other of the context processes. Most process servers within the present invention function that way. Initial access is by name. Once the desired function (such as a window or file) is "opened", the user process and the service communicate directly via PID's.

A "message" is a variable-length buffer (limited only by the processor's physical memory size) which carries information between processes. A header, inaccessible to the programmer, contains the destination name and the sender s PID. By convention, the first field in a message is a null-terminated string which defines the type of message (e.g., "read", "status", etc.) Messages are queued to the receiving process when they are sent. Queuing ensures serial access and is used in preference to semaphores, monitors, etc.

Messages provide the mechanism by which hardware transparency is achieved. A process located anywhere in the virtual machine can send a message to any other process if it knows its name. Transparency applies with some restrictions across bridgeways (i.e., the interfaces between LAN's operating under identical network protocols) and, in general, not at all across gateways (i.e., the interfaces between LAN's operating under different network protocols) due to performance degradation. However, they could so operate, depending upon the required level of performance.

Inter-Process Communication

All inter-process communication is via messages. Consequently, most of the virtual machine primitives are concerned with processing messages. The virtual machine kernel primitives are the following:

ALLOC—requests allocation of a (message) buffer of a given size.

FREE—requests deallocation of a given message buffer.

PUT—end a message to a given destination (by name or PID).

GET—wait for and dequeue the next incoming message, optionally from a specific process (by PID).

FORWARD—pass a received message through to another process.

CALL—send a message, then wait for and dequeue the reply.

REPLY—send a message to the originator of a given message.

ANY MSG—returns "true" if the receive queue is not empty, else returns "false"; optionally, checks if any messages from a specific PID are queued.

To further describe the function of the kernel primitives, ALLOC handles all memory allocations. It returns a pointer to a buffer which can be used for local storage within the process or which can be sent to another process (via PUT, etc.). ALLOC never "fails", but rather waits until enough memory is freed to satisfy the request.

The PUT primitive queues a message to another process. The sending process resumes execution as soon as the message is queued.

FORWARD is used to quickly reroute a message but maintain information about the original sender (whereas PUT always makes the sending process the originator of the message).

REPLY sends a message to the originator of a previously received message, rather than by name or PID.

CALL essentially implements remote subroutine invocations, causing the caller to suspend until the receiver executes a REPLY. Subsequently, the replied message is dequeued out of sequence, immediately upon arrival, and the caller resumes execution.

The emphasis is on concurrency, so that as many processes as possible are executed in parallel. Hence neither PUT nor FORWARD waits for the message to be delivered. Conversely, GET suspends a process until a message arrives and dequeues it in one operation. The ANY_MSG primitive is provided so that a process may determine whether there is anything of interest in the queue before committing itself to a GET.

Figure 5:
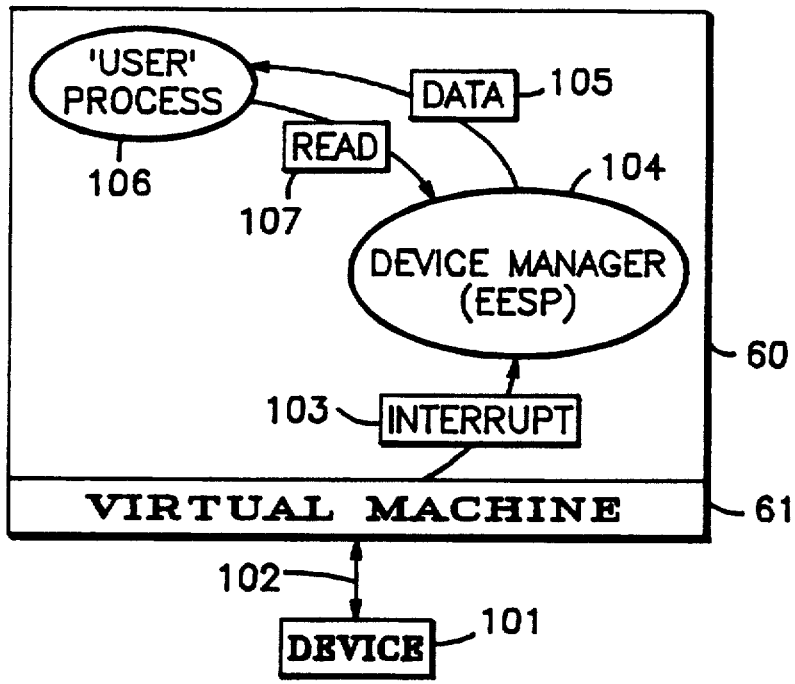
FIG. 5 shows the relationship between a user process and a resource process as they relate to the present invention.

With reference now to FIG. 5, the relationship of external events to process will be described. The virtual machine 61 makes devices look like processes. For example, when an interrupt occurs in an external device 101, the virtual machine kernel 61 queries an interrupt massage 103 to a specific process 104, known as an "external event service process" (EESP), functioning as the device manager. For efficiency, the message is preallocated once and circulates between the EESP and the kernel. The message contains just enough information to indicate the occurrence of the event. The EESP performs all hardward-specific functions related to the event, such as setting control registers, moving data 105 to a user process 106, transmitting "Read" messages from the user process 106, etc., and then "releasing" the interrupt.

To become an EESP, a process issues a "connect" primitive specifying the appropriate device register(s). It must execute a "disconnect" before it exits. Device-independence is achieved by making the message protocol between EESP's and applications processes the same wherever possible.

When a message is sent by name, the destination process must be found in the name space. The search path is determined by the nesting of the contexts in which the sending process resides. From a given process, a message can be sent to all processes in its own context or (optionally) to those in any higher context.

Figure 6:
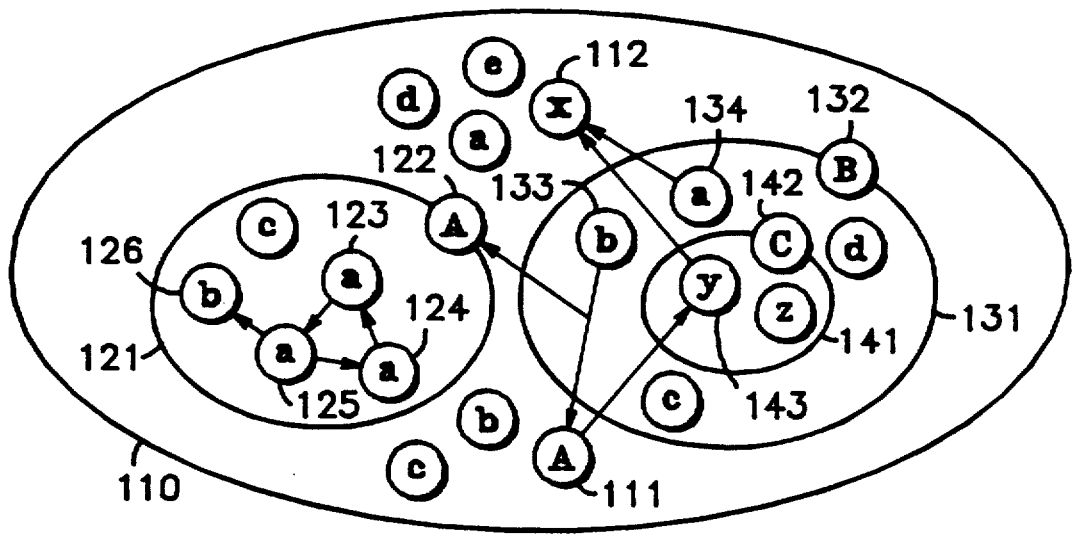
FIG. 6 shows how messages may be sent between processes within nested contexts in the data processing system of the present invention.

Refer to FIG. 6. The contexts are searched from the current one upward until a match is found or until the system context is reached. All processes with the same name in that context are then queued a copy of the message.

For example, with reference to FIG. 6, assume that in context 141 process y sends a message to ALL processes by the name x. Process y first searches within its own context 141 but finds no process x. The process y searches within the next higher context 131 (its parent context) but again finds no process x. Then process y searches within the next higher context 110 and finds a process x, identified by reference numeral 112. Since it is the only process x in context 110, it is the only recipient of the message from process y.

If process a in context 131 sends a message to ALL processes by the name x, it first searches within its own context 131 and, finding no processes x there, it then searches within context 110 and finds process x (112).

Assume that process b in context 131 sends a message to ALL processes by the name A. It would find process A (111) in context 110, as well as process A (122) which is the context process for context 121.

A process may also send a message to itself or to its context process without knowing either name explicitly.

The concept of a "logical ring" (analogous to a LAN) allows a message to be sent to the NEXT process in the system with a given name. The message goes to exactly one process in the sender's context, if such a process exists. Otherwise the parent context is searched.

The virtual machine guarantees that each NEXT transmission will reach a different process and that eventually a transmission will be sent to the logically "first" process (the one that sent the original message) in the ring, completing the loop. In other words, all processes with the same name at the same level can communicate with each other without knowing how many there are or where they are located. The logical ring is essential for distributing services such as a data base. The ordering of processes in the ring is not predictable.

For example, if process a (125) in context 121 sends a message to process a using the NEXT primitive, the search finds a first process a (124) in the same context 121. Process a (124) is marked as having received the message, and then process a (124) sends the message on to the NEXT process a (123) in context 121. Process a (123) is marked as having received the message, and then it sends the message on to the NEXT process a, which is the original sender process a (125), which knows not to send it further on, since it's been marked as having already received the message.

Sending messages directly by PID obviates the need for a name search and ignores context boundaries. This is known as the mode of transmission and is the most efficient. For example, process A (111) sends a message in the DIRECT mode to process y in context 141.

If a process sends a message in the LOCAL transmission mode, it sends it only to a process having the given name in the sender's own context.

In summary, including the DIRECT transmission mode, there are five transmission modes which can be used with the PUT, FORWARD, and CALL primitives:

ALL—to all processes with the given name in the first context which contains that name, starting with the sender's context and searching upwards through all parent contexts.

LOCAL—to all processes with the given name in the sender's context only.

NEXT—to the next process with the given name in the same context as the sender, if any; otherwise it searches upwards through all parent contexts until the name is found.

LEVEL—sends to "self" (the sending process) or to "context" (the context process corresponding to the sender's context); "self" cannot be used with CALL primitive.

DIRECT—sent by PID.

Messages are usually transmitted by queueing a pointer to the buffer containing the message. A message is only copied when there are multiple destinations or when the destination is on another node.

Operating System

The operating system of the present invention consists of a kernel, which implements the primitives described above, plus a set of processes which provide process creation and termination, time management (set time, set alarm, etc.) and which perform node start-up and configuration. Drivers for devices are also implemented as processes (EESP's), as described above. This allows both system services and device drivers to be added or replaced easily. The operating system also supports swapping and paging, although both are invisible to applications software.

Unlike known distributed computer systems, that used in the present invention does not use a distinct "name server" process to resolve names. Name searching is confined to the kernel, which has the advantage of being much faster.

A minimal bootstrap program resides permanently (in ROM) on every node, e.g. ROM 28 in node N of FIG. 2. The bootstrap program executes automatically when a node is powered up and begins by performing basic on-board diagnostics. It then attempts to find and start an initial system code module. The module is sought on the first disk drive on the node, if any. If there isn't a disk, and the node is on the LAN, a message will be sent out requesting the module. Failing that, the required software must be resident in ROM. The initialization program of the kernel sets up all of the kernel's internal tables and then calls a predefined entry point of the process.

In general, there exists a template file describing the initial software and hardware for each node in the system. The template defines a set of initial processes (usually one per service) which are scheduled immediately after the node start-up. These processes then start up their respective subsystems. A node configuration service on each node sends configuration messages to each subsystem when it is being initialized, informing it of the devices it owns. Thereafter, similar messages are sent whenever a new device is added to the node or a device fails or is removed from the node.

Thus there is no well-defined meaning for "system up" or "system down"—as long as any node is active, the system as a whole may be considered to be "up". Nodes can be shut down or started up dynamically without affecting other nodes on the network. The same principle applies, in a limited sense, to peripherals. Devices which can identify themselves with regard to type, model number, etc. can be added or removed without operator intervention.

Standard Message Format

Figure 7:
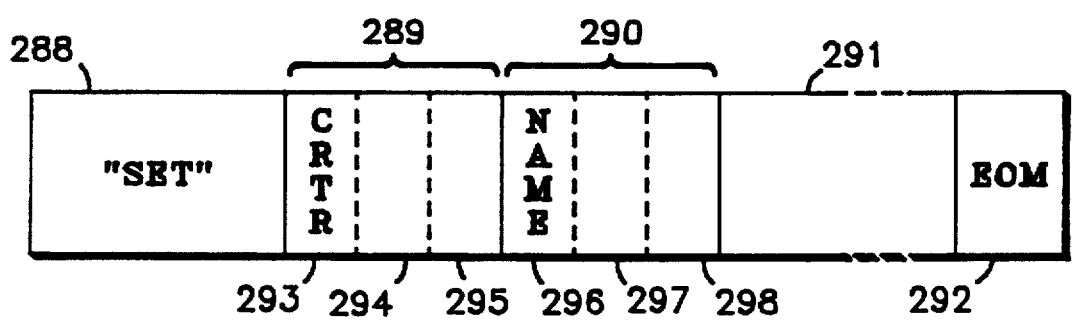
FIG. 7 shows the standard format of a message in the distributed message-based data processing system of the type incorporating the present invention.

FIG. 7 illustrates the standard format of a message in the distributed data processing system of the type described herein. The message format comprises a message i.d. portion 288, one or more "triples" 289 and 290, and an end-of-message portion 292. Each "triple" comprises a group of three fields, such as fields 293-295. The first field 293 of the first triple 289 specifies that a Process Creation Monitor (CRTM) has to be set.

In the second triple 290 the first field 296 specifies that the data field represents the name of the process to be acted upon, such as the process whose creation is to be monitored. The second field 297 gives the size of the data field. The third field 298 is the data field. A message can have any number of "triples".

As presently implemented, portion 288 is 16 bytes in length, field 296 is 4 bytes, field 297 is 4 bytes, field 298 is variable in length, and EOM portion 160 is 4 bytes.

As shown in FIG. 7, the message i.d. portion 288 describes a "SET" command, and field 298 names a process. When the message is sent by the requesting process to a Process Manager Process, message portion 291 is empty, but when the message is returned to the requesting process by the PMP, message portion 290 will contain the process "connector". The process connector identifies the designated process by processor identification number (PID) and its process channel, and it forms the link between the designated process and the requesting process. Processor connectors are described in greater detail in Invention No. 11 identified above.

Resource/Connector Model

The distributed system of the present invention may be viewed at several levels of complexity. The base level is the virtual machine, which defines and implements the device-independent architecture, consisting of virtual "instructions", i.e. the kernel primitives.

Layered immediately above this, and closely related to it, is the process/message model which defines how programs are configured in the system and how they communicate with each other.

Just above this level is a more abstract model dealing with "resources" and "connectors". As mentioned earlier, resources may be thought of as "logical devices". Resources are accessed through "connectors", which are essentially logical "pointers".

An application must have a connector to a resource in order to interact with it. Connectors are granted and controlled by "resource manager processes", i.e. processes which can be requested to create, delete, etc. resources.

Resource manager processes respond to connector messages to "create" new resources and "delete" old ones, and to "open" an existing resource (i.e. ask for a connection to it) and later to "close" it (terminate the connection to it).

The response to creating a resource, or opening a connection to it, is a connect message. This message contains a service-independent connector data structure which uniquely identifies the resource.

An application may create a new resource, or acquire access to an existing one, by making a request to the appropriate resource manager process. (Note that all resources remain controlled and protected by the resource manager process, and they are kept in its context.) As a result, a connector to the resource is returned to the application, allowing it to communicate directly with the resource. Note that in general two connectors are required one for the resource manager process, and one for the resource (although in many cases the resource manager process can be accessed by name).

When a connector is received in a message, it identifies a specific resource to which the receiving process has access. The entire connector must be copied into subsequent request messages to the resource. The messages themselves are usually sent in "direct" mode, passing the address of the connector. As mentioned above, messages to the resource's manager can be sent by name, if appropriate, or via an explicit connector (to the manager), if available.

Both "create" and "open" requests to the resource manager process usually expect a process name as a parameter, and both return a connection message. A "create" request without a name causes the service to generate a unique name An "open" request using a connector instead of a name may be employed to access the resource differently or to gain access to a closely related resource. The "delete" and "close" requests may accept either an explicit connector to the resource or the resource's name.

There are five formats for connection messages: "create", which requests the creation of a new resource; "open", which establishes a connection to an existing resource; "delete", which requests that a specified resource be removed from the system; "close", which requests that the connection to a resource be terminated; and "connect", which provides a connection to a resource. The "connect" message normally represents a response to a "create" or "open" request and is not generally sent unsolicited.

Data exchange messages are another type of message used in the distributed system of the present invention. Data in any format is sent solely by means of the "write" message. Data is requested by the "read" message (to which "write" or "failed" are the only responses.

Process which only generate data should respond with "failed" to "write" requests. Conversely, a write-only resource should return "no data" (i.e. a "write" message without a data "triple") if it receives a "read" request.

There are two formats for data exchange messages: "write", which is used to send data; and "read", which is used to request data. A "write" message includes the source of the data, the destination resource, the originator of the data, the type of data (if known), and it contains a block of data. A "read" message includes the destination resource, an optional prompt string (which must be written exactly before any data is read), and a protect parameter which indicates that the input should be protected if possible.

Appropriate status messages are used to convey the completion status of a request, or the current state of a service or resource. In the latter case, the status message may be requested explicitly or may be sent as the result of a synchronous event within the resource itself.

There are four formats for status messages: "query", which asks for the current status of a resource; "done", which indicates that a previous request has successfully completed; "failed", which indicates that a previous request has not completed; and "status", which gives the status of a resource, either in response to "query" or as the result of an asynchronous condition.

DETAILED DESCRIPTION OF THE INVENTION

Figure 8:
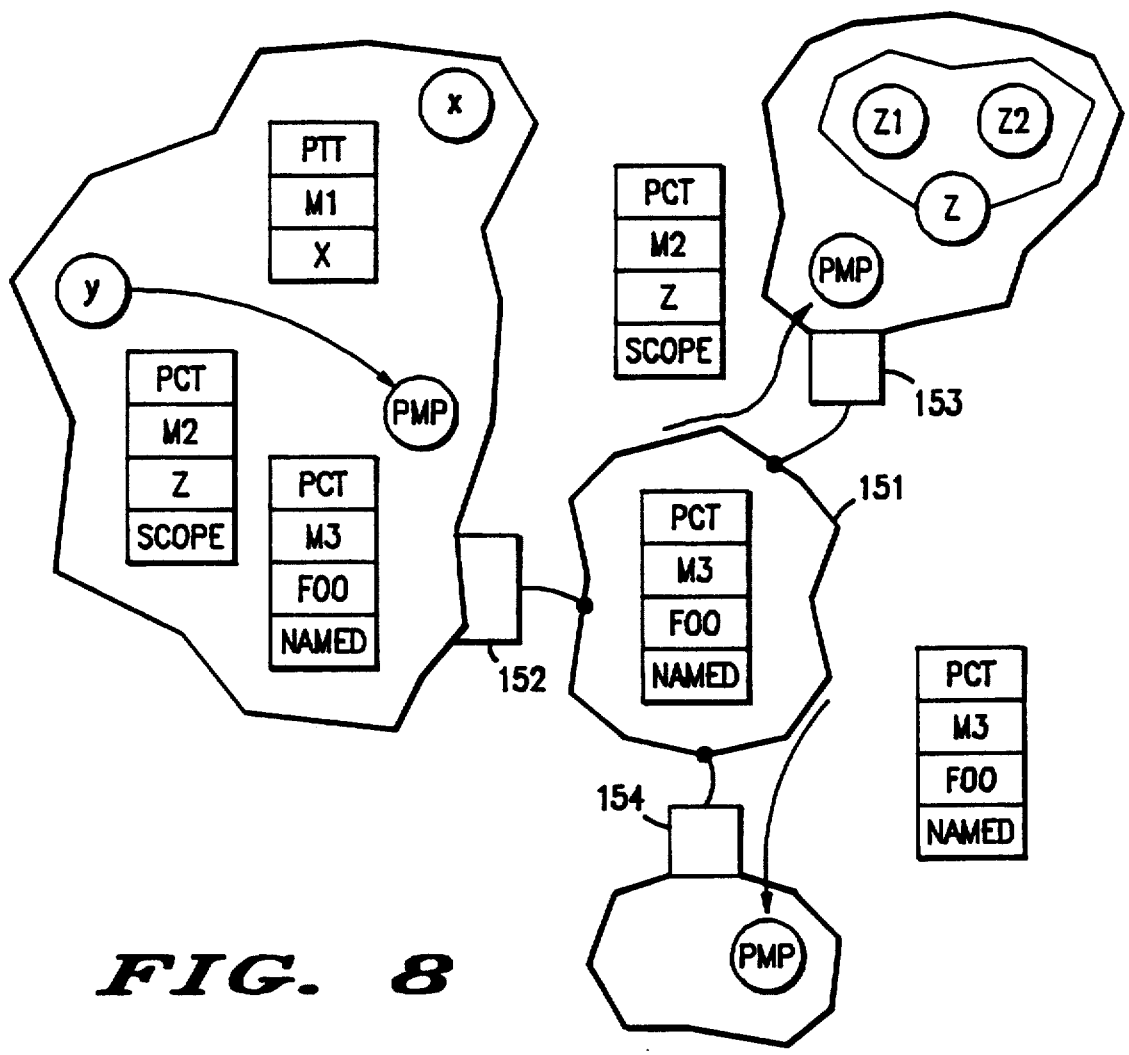
FIG. 8 shows how Process Creation Monitor (PCM) messages and Process Termination Monitor (PTM) messages are sent between Process Manager Processes (PMP) in a distributed data processing system of the type incorporating the present invention.

FIG. 8 shows how Process Creation Monitor (PCM) messages and Process Termination Monitor (PTM) messages are sent between Process Manager Processes (PMP) in a distributed data processing system of the type incorporating the present invention. A process Creation Trap as used herein is a program, or routine, which is triggered by the creation of a process. The trap may suspend the process pending further action and will send a notification of the creation of the process via a message to the requesting process, or the like. Similarly, a Process Termination Trap as used herein is a program, or routine, which is triggered by the termination of a process. The trap may suspend the termination of the process pending further action and will send notification of the termination of the process via a message to the requesting process, or the like. A Process Manager Process exists at the most basic level of the operating system, i.e. the kernel. It is the only process which can create and terminate processes. There is exactly one Process Manager Process in every node of the system, such as nodes 152-154 shown in FIG. 8.

Any process, such as process "y" on node 152, can send a Process Creation Monitor (PCM) request message or a Process Termination Monitor (PTM) request message to the Process Manager Process (PMP) residing on its own node. If the monitor request refers to processes to be created or terminated on other nodes, the PMP of the host node forwards or broadcasts the request to the PMP of another or all other nodes.

The request for notification can be made specific to one node, several nodes, or the entire system. On the other hand, it may be limited to one context. The requesting process can be located anywhere in the system.

A monitor request is not forwarded or broadcasted to any other node if the requesting process explicitly restricts the scope of the request to the local node; if it restricts the scope of the request to a context of processes local to the host node; or if the request explicitly identifies a process to be monitored that exists on the local node. For example, the PTM request "ml"0 to monitor process "x" existing on the same node is kept by the PMP of the host node 152.

A monitor request is forwarded to another node if the requesting process explicitly restricts the scope of the request to that of another node; if it restricts the scope of the request to a context of processes local to that other node; or if the request explicitly identifies a process to be monitored that exists on that other node. For example, the PCM request "m2" to monitor creation of processes in the context of the "z" process existing on node 153 is forwarded to the PMP of that node, and it is not kept on the local node.

A monitor request is broadcasted to all nodes if the requesting process does not restrict the scope of the request and it does not identify any specific existing process or if it restricts the scope of the request to a context of processes that spans all nodes of the network. A monitor request broadcasted to all nodes is also stored on the host node. For example, the PCT request "m3" to monitor creation of processes with the name of "foo" regardless of its location in the network is broadcasted to both nodes 153 and 154 in addition to keeping it on the node 152 as well.

The Process Creation Monitor or Process Termination Trap request specifies that a receiving Process Manager Process notify the requesting process y whenever a designated process is created or terminated on nodes 152, 153, or 154.

When a process is created with the name designated in the Process Creation Monitor, the Process Manager Process that received the Creation Monitor Request then replies to the process or processes which requested that the Process Creation Monitor be set, and the monitor is released. This is referred to as the "resolution" of a Process Creation Monitor.

Likewise when a process is terminated which was identified in the Process Termination Monitor, the Process Manager Process responsible for terminating such process then replies to the process or processes which requested that the Process Termination Monitor be set, and the Monitor is released. This is referred to as the "resolution" of a Process Termination Monitor.

Figure 9:
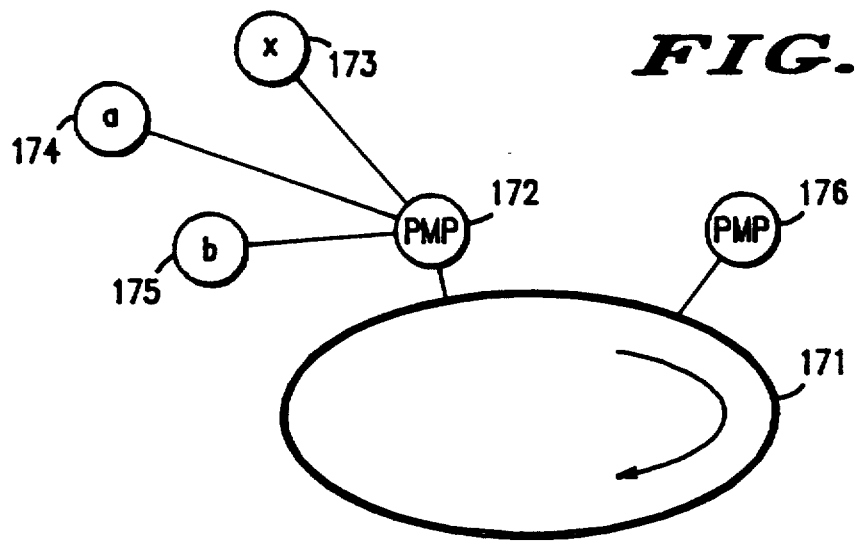
FIG. 9 shows a distributed data processing system illustrating how user processes a and b are notified when a resource process x has been created or terminated.

FIG. 9 shows a distributed data processing system comprising network 171 with nodes 172 and 176, each having a Process Manager Process (PMP). At node 172 user processes a and b both desire to be informed if and when a process x is created, so they send Process Creation Monitor request messages to the Process Manager Process on node 172. If process x is subsequently created, by whatever process in the system for whatever reason, the Process Manager Process on node 172 notifies both processes a and b of the fact.

It is useful for user processes to know where to find various serving processes which have been created, e.g. a fast Fourier analysis process, Event Log Service Process (see FIG. 11), etc.

With respect to other features of the invention, various other actions may be specified regarding the setting or resolution of Process Creation Monitors or Process Termination Monitors, or regarding monitored processes. For example, Process Creation Monitor requests may be made conditional upon the current existence of processes with the designated name. Also, process monitor requests may specify that resolved monitors are to be automatically reinstated. In this case a replied monitor is not released.

In addition, a Process Creation Monitor request may specify that monitored processes are to be suspended until such suspension is released. Also the requesting process may request the removal of process monitors which have been unresolved within some period of time, or it may request such removal unconditionally. Further, the requesting process may request that information regarding the created/terminated process in addition to its name should be returned to the requesting process upon resolution of the process monitor.

A Process Creation Monitor may or may not specify the name of the process whose creation has to be monitored. If the process name is not specified, any process created in the specified scope is monitored.

If the scope of a Process Creation Monitor request is the entire network, such as network 151, then the Process Manager Process of the requesting node (e.g. node 152) broadcasts the monitor request to the Process Manager Processes of all nodes 152-154 of the network. When the Process Creation Monitor is resolved by the Process Manager Process of a node, and monitor removal upon resolution is requested, the trap resolution is reported to the Process Manager Processes of all nodes. A remotely resolved Process Creation Monitor is always replied through the Process Manager Process of the requesting node in order to eliminate race conditions which could occur in the case of simultaneous monitor resolutions.

FIG. 10 shows a distributed data processing system illustrating how Process Manager Processes are notified when a Process Creation Monitor is resolved on a remote node. A network 181 comprises nodes 182, 185, 187, and 189, each having a Process Manager Process (PMP). Each node also has an associated list of monitors 183, 186. 188, and 190. Any time such node receives a PCM with a process name, it adds to its list of monitors the name of the process whose creation is to be reported.

Assume that a process located at node 187 broadcasts a Process Creation Monitor request for a process x. Each of the nodes then adds process x to its associated list of monitors. Assume too that process x is subsequently created at node 182. Then the Process Manager Process at node 182 will delete process x from its list of monitors and add process x to its list of processes 184. The PMP of node 182 next notifies the PMP of node 187 that process x was created. Then the PMP of node 187 notifies the other PMP's of the network (i.e. on nodes 185 and 189) that process x was created.

If the process specified in a Process Termination Monitor cannot be located on the requesting node, the request is forwarded to the Process Manager Process of the next node. It is forwarded in the ring of Process Manager Processes until the process is found. A resolved Process Termination Monitor is always directly replied from the node of resolution to the process requesting the Process Termination Monitor regardless of its location in the network.

The present invention has significant utility in several respects, particularly in the distributed, process/message system herein-disclosed. Numerous modules of the operating system rely upon notification of process creations and terminations—for example, configuration management, error management, debug services, performance monitors, process directory, and system statistics reporters.

Process creation and termination monitor messages provide a facility to link to the Process Management from these modules at run-time. The process monitor messages also reduce the dependency of these modules on the process description representation details.

In a conventional operating system, resources (e.g. files) allocated by processes are recorded in the process description data structures. The release of resources allocated by terminating processes have to be explicitly initiated by a process termination algorithm. Therefore, changes in the configuration of the system-wide supported resource types have to be reflected in the process description data structures and in the process termination algorithm.

In the present invention, by requesting a Process Termination Monitor at each resource allocation for a process, the resource managers are notified when the allocating process terminates, and the resource release can be initiated by the resource manager itself. Adding new types of resource managers to the system does not change the process description data structure or the process termination algorithm.

For example, if a process is terminated because of a fault or because it is completed, normally it is important to release all resources which have been allocated to such process.

Also in a multiprocess system, various functions can be invoked upon the creation of a process. Process Creation Monitors provide a simple, efficient, and configurable way of passing control between functions and of synchronizing functions.

FIG. 11 shows how the present invention may be used to facilitate error management in a distributed data processing system. In network 161 each node 162-164 may have one or more resources associated with it (not shown). For an Error Management Process (EMP) it is desirable to access an Event Log Service Process (ELSP) on any node for the purpose of logging various events associated with such nodal resources. When an ELSP is first created, for example on node 154, one or more error management processes in the network may be notified, so that such error management processes are made aware of the location of the ELSP in the system, so that the ELSP can be polled, given commands, etc.

Otherwise, if no ELSP is accessible, the error management processes have to use lower level system services to log events in simpler form; these are available on every node.

DESCRIPTION OF PROGRAM LISTINGS

Program Listing A contains a "C" language implementation of the concepts relating to the process monitors as described hereinabove. These concepts are also represented in flowchart form by FIGS. 12A-12H for the convenience of the reader.

Figure 12A:
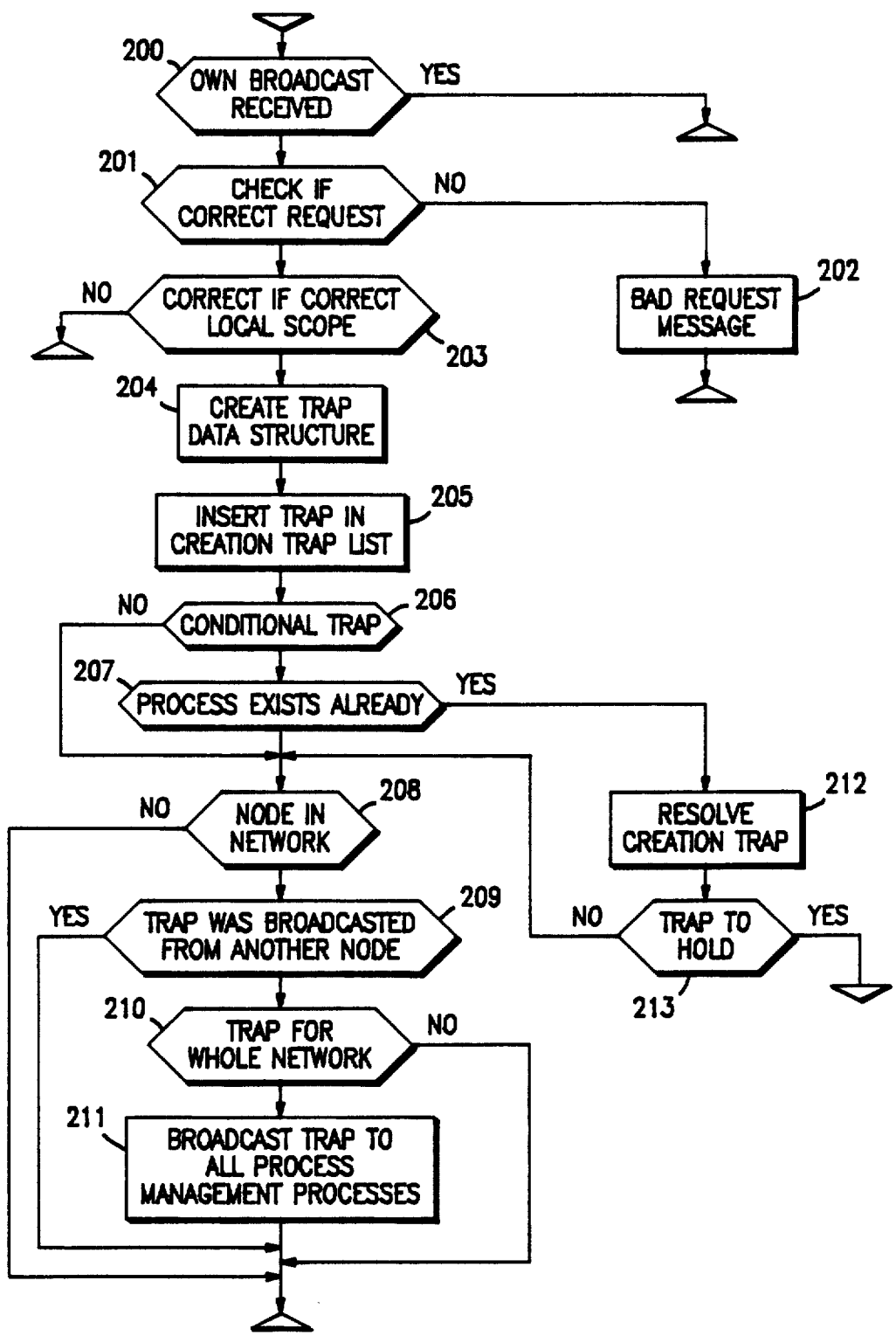
FIG. 12A shows a flowchart illustrating an operation to Set a Process Creation Monitor.

FIG. 12A shows a flowchart illustrating an operation by a Process Manager Process (PMP) to Set a Process Creation Monitor. This operation is performed by appropriate code contained within Program Listing A of the present invention. In decision block 200 if the PMP is receiving its own broadcast the routine is terminated; but if not it proceeds to decision block 201. In decision block 201 if the monitor request is correct, the routine proceeds to block 203; if not, the routine passes to block 202 to generate a bad request notification.

In decision block 203 the request is checked if it has a correct scope local to the node; if yes, a creation monitor data structure is allocated and initialized in block 204; otherwise the request is either forwarded to other nodes or it is rejected.

In block 205 the new monitor data structure is inserted either in the list of unresolved creation monitors for a given process name that are organized in a hash table, or it is inserted in the list of unnamed process creation monitors that are linked according to the scope of the monitor.

Next in decision block 206 if this is a conditional monitor, the routine passes to decision block 207; if not it proceeds to decision block 208. In decision block 207 if the process already exists the routine passes to block 212 where the creation monitor is resolved if not it proceeds to decision block 208.

In decision block 213, if the resolved conditional monitor is to be held, the monitor may get broadcasted to other nodes; else the routine terminates.

In decision block 208 if there is no node in the network the routine terminates; otherwise it proceeds to decision block 209. In decision block 209 if the monitor was broadcasted from another node the routine terminates; otherwise it proceeds to decision block 210. In decision block 210 if this monitor is not restricted to the local node, the routine passes to block 211, where the monitor is broadcasted to all PMP's in the network; otherwise the routine terminates.

Figure 12B:
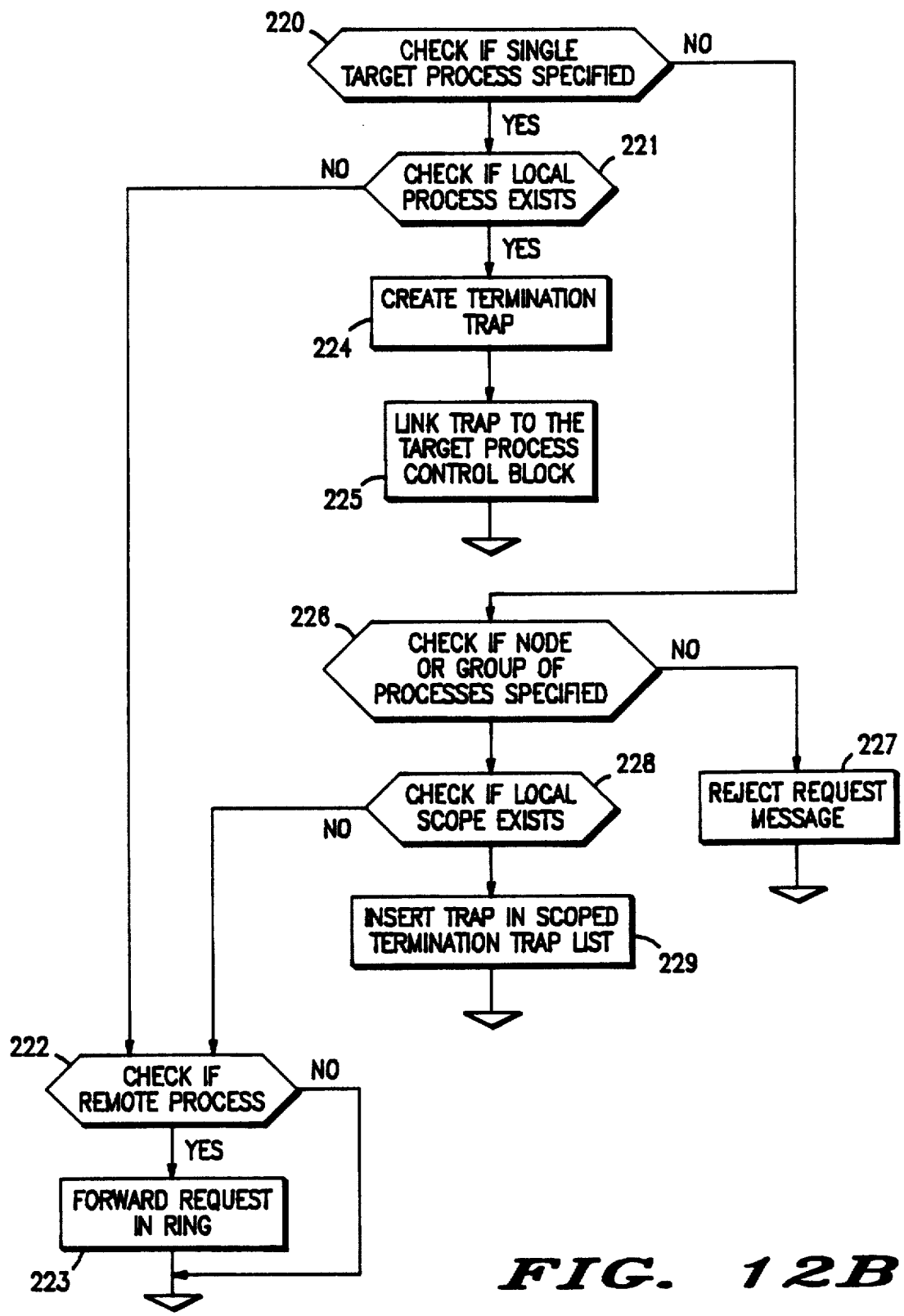
FIG. 12B shows a flowchart illustrating an operation to Set a Process Termination Monitor.

FIG. 12B shows a flowchart illustrating an operation to Set a Process Termination Monitor. In decision block 220, it checks whether a single process is monitored; if yes, it proceeds to check in block 221 whether this is a process existing on the local node. If not, in decision block 222 it checks whether the request refers to a remote process; if yes, in block 223 the request is forwarded to the next node in the ring; else the routine terminates rejecting the request.

If the local process exists, in block 224 the termination monitor data structure is created; then in block 225 it is linked to the Process Control Block of the specified process.

If the request did not specify a single process, in decision block 226 the specification of a node or a group of processes is checked; if these are not specified either, the request is rejected in block 227.

Otherwise, in decision block 228 the existence of the scope on the local node is checked, if it exists, the termination monitor is inserted in the list of scoped termination monitors for this node in block 229; else a remote target scope is searched starting from decision block 222 similarly to the single process termination monitor requests.

Figure 12C:
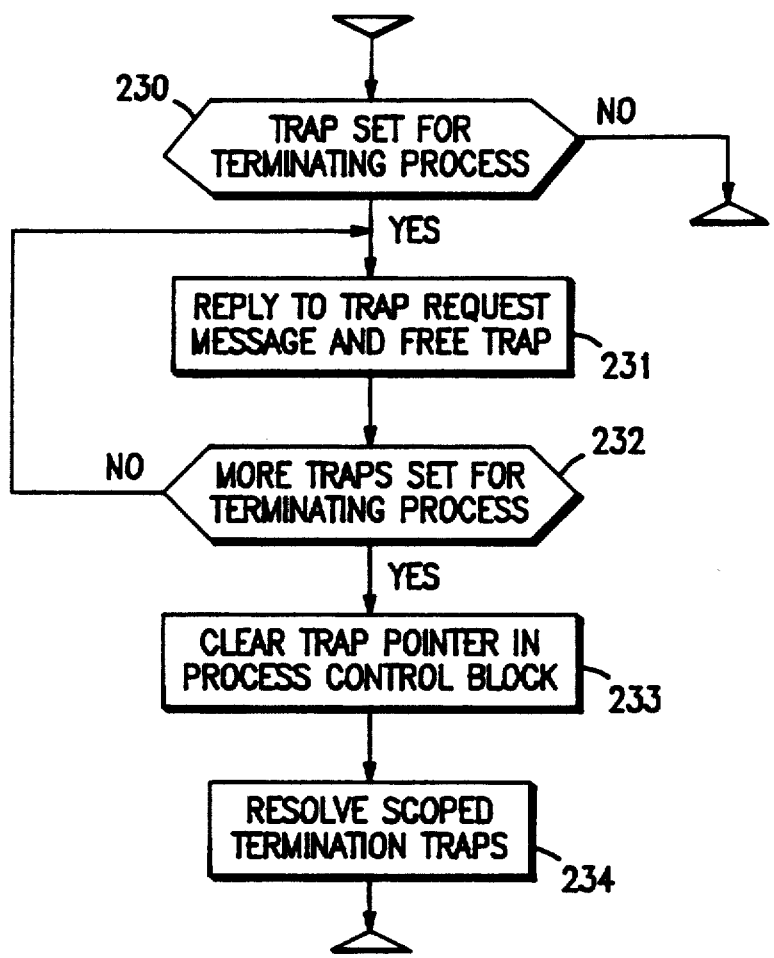
FIG. 12C shows a flowchart illustrating an operation to Resolve a Process Termination Monitor.

FIG. 12C shows a flowchart illustrating an operation to Resolve a Process Termination Monitor. In decision block 230 if the monitor is not set for the terminating process, the routine terminates; otherwise it passes to block 231, where a reply is made to the monitor request message and the monitor is freed. After block 231 the routine passes to decision block 232. In decision block 232 if no more monitors are set for the terminating process, the routine passes to block 233, where the monitor pointer is cleared in the Process Control Block; if not the routine returns to block 231.

After all possible termination monitors on this one specified process have been resolved, in block 234 a similar algorithm resolves all scoped monitors where the terminating process falls in the specified scope.

Figure 12D:
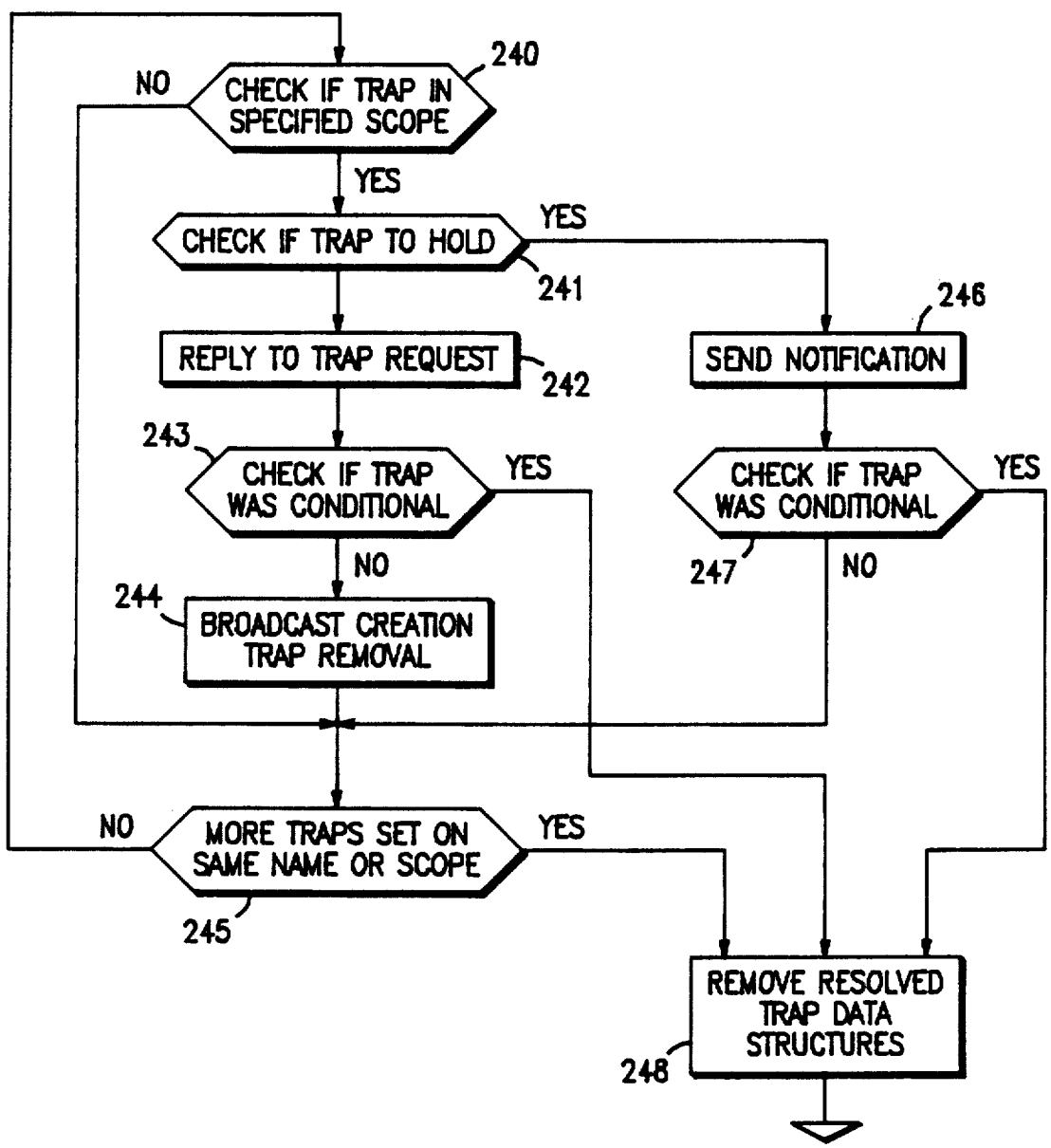
FIG. 12D shows a flowchart illustrating an operation to Resolve a Process Creation Monitor.

FIG. 12D shows a flowchart illustrating an operation to Resolve a Process Creation Monitor. In decision block 240, if the created process is in the scope of the located monitor, it proceeds to block 241 to check if the monitor is to be held; otherwise it proceeds to block 245 to check whether there are more monitors to check for the same process name or scope.

If the monitor should not be held, it is replied in block 242; else only a notification is sent to the requesting process in block 246. In both cases it is checked whether the monitor was conditional in blocks 243 and 247; if yes, the data structure of the resolved monitor is removed.

If the monitor was not conditional and it did not have to be held, a creation monitor removal request is broadcasted to all nodes of the network in block 244.

If no more monitors are set on the same process name and on an encompassing scope, the resolved data structures are removed in block 248; else the next monitor in the list is checked in decision block 240.

Figure 12E:
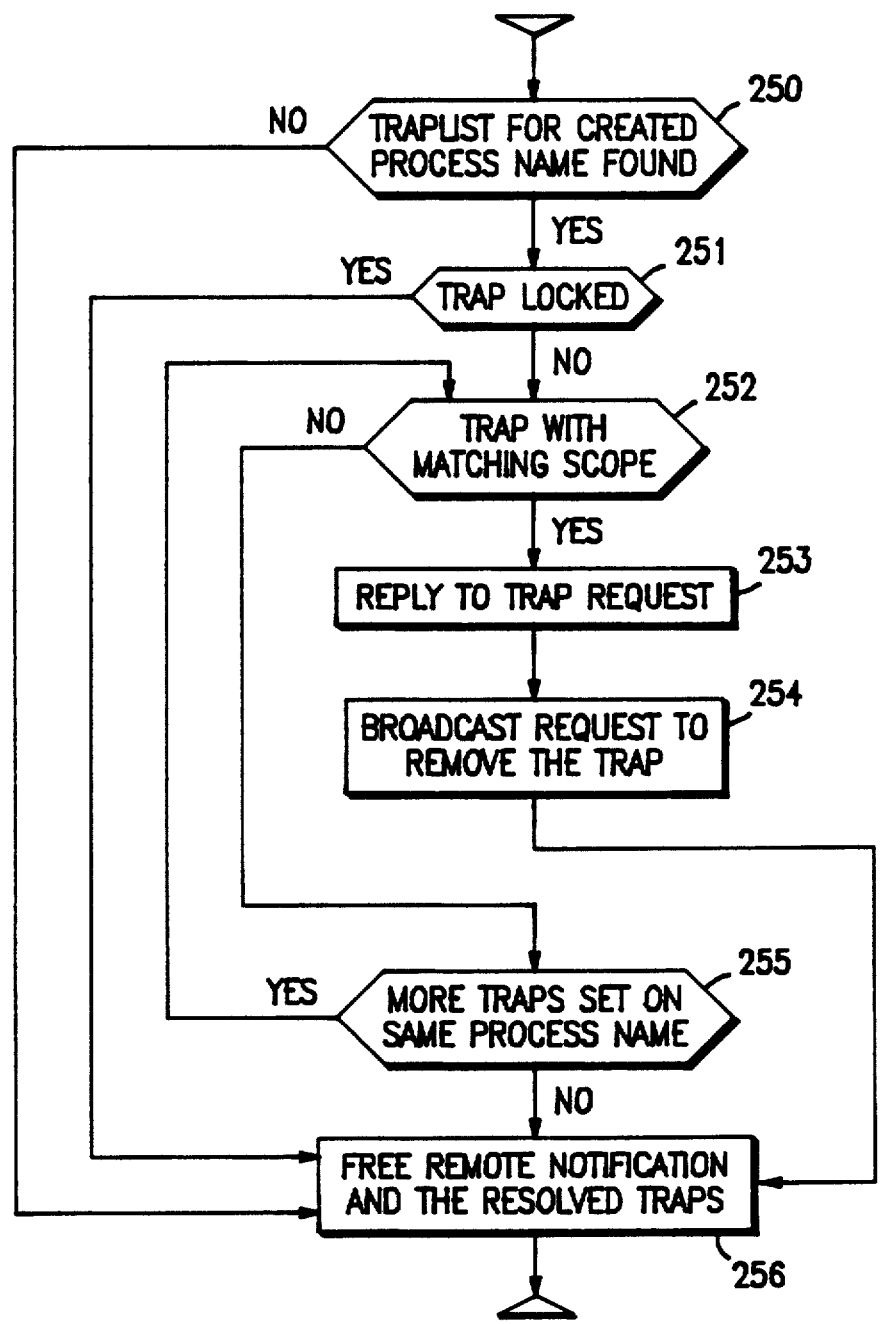
FIG. 12E shows a flowchart illustrating an operation to handle a Creation Monitor Resolution From Other Nodes.

FIG. 12E shows a flowchart illustrating an operation to handle a Creation Monitor Resolution From Other Nodes. In decision block 250 if the monitor list is found for the created process name, the routine passes to decision block 251; if not it proceeds to block 256, where the remote notification is freed.

In decision block 251 if the monitor is locked, then the routine passes to block 256; if not it proceeds to decision block 252. In decision block 252 if there is a monitor with a matching scope, the routine passes to block 253; otherwise it proceeds to decision block 255. In block 253 a reply is made to the monitor request, and the routine then passes to block 254, where a request to remove the monitor is broadcast. After block 254 the routine passes to block 256.

In decision block 255 if more monitors are set on the same process name, the routine returns to decision block 252; if not it proceeds to block 256.

Figure 12F:
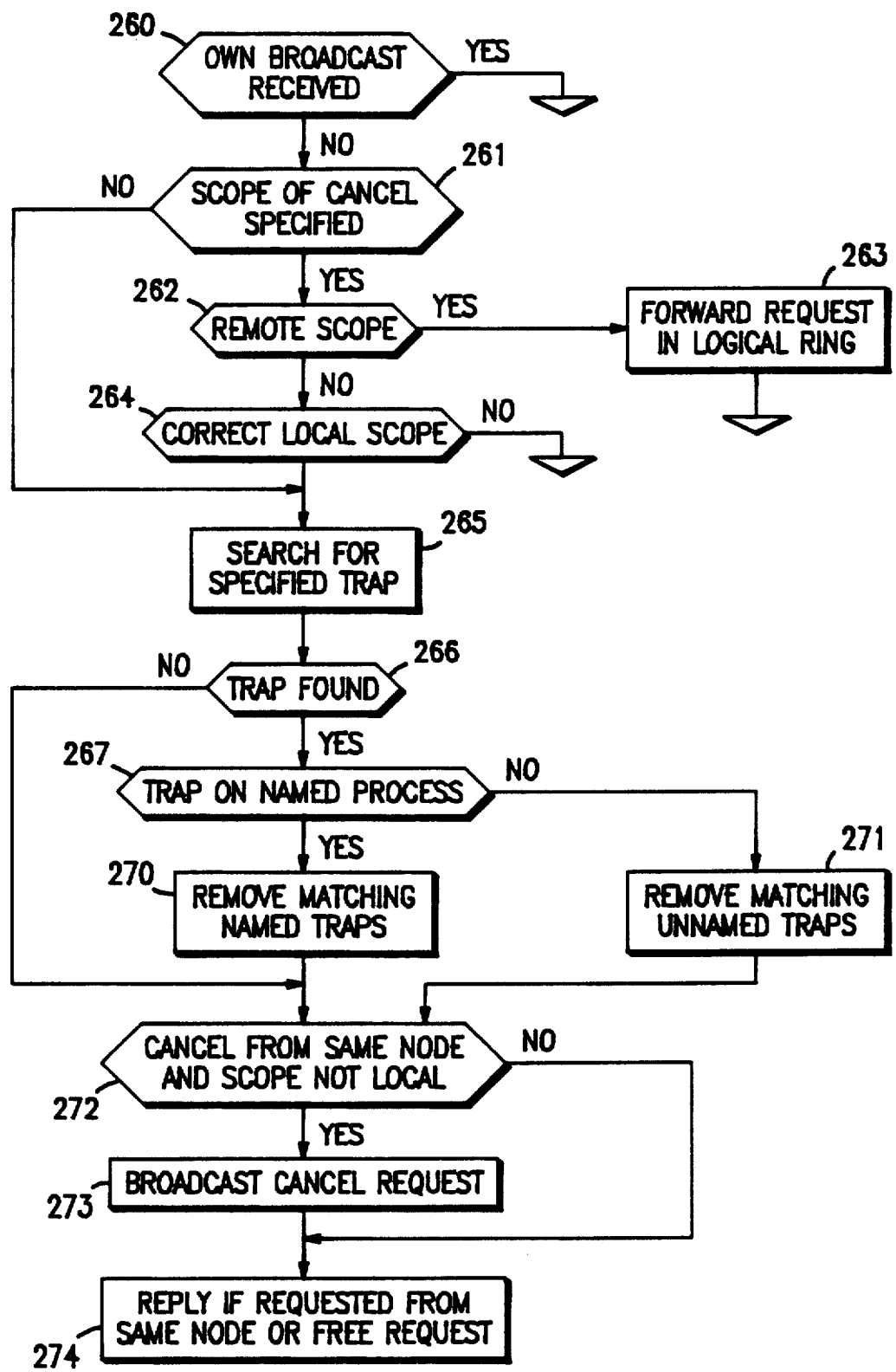
FIG. 12F shows a flowchart illustrating an operation to Cancel a Process Creation Monitor.

FIG. 12F shows a flowchart illustrating an operation to Cancel a Process Creation Monitor. In decision block 260, if own broadcast is received, the routine terminates; else in decision block 261 it is checked if any scope is specified in the cancel request. If yes, it proceeds to decision block 262 to check if the scope belongs to a remote node; else it proceeds to block 265.

If a remote scope was specified, the request is forwarded to the next node in block 263; else in decision block 264 the correctness of the specified scope is checked: whether the scoping process exists and whether it is a context process. If the local scope is incorrect, the request is rejected and the routine terminates; else it proceeds to block 265.

In block 265, a monitor that satisfies the specification of the cancel request is searched for, and in decision block 266 it is checked if such monitor was found; if not, it proceeds to block 272; else in decision block 267 it is checked if the located monitor contains a specific process name. If yes, in block 270 all monitors are removed from the hashed list of named process monitors that specify the same process name and a scope that encompasses the scope specified in the cancel request; if not, in block 271 all monitors are removed from the list of unnamed process monitors that specify an encompassing scope.

If no monitors have been found on the node or when all matching monitors have been removed, the routine proceeds to decision block 272 to check whether the cancel request has to be broadcast. If yes, it proceeds to block 273 to broadcast the cancel request; else it directly proceeds to block 272 to reply to the cancel request if requested or to free the request message.

Figure 12G:
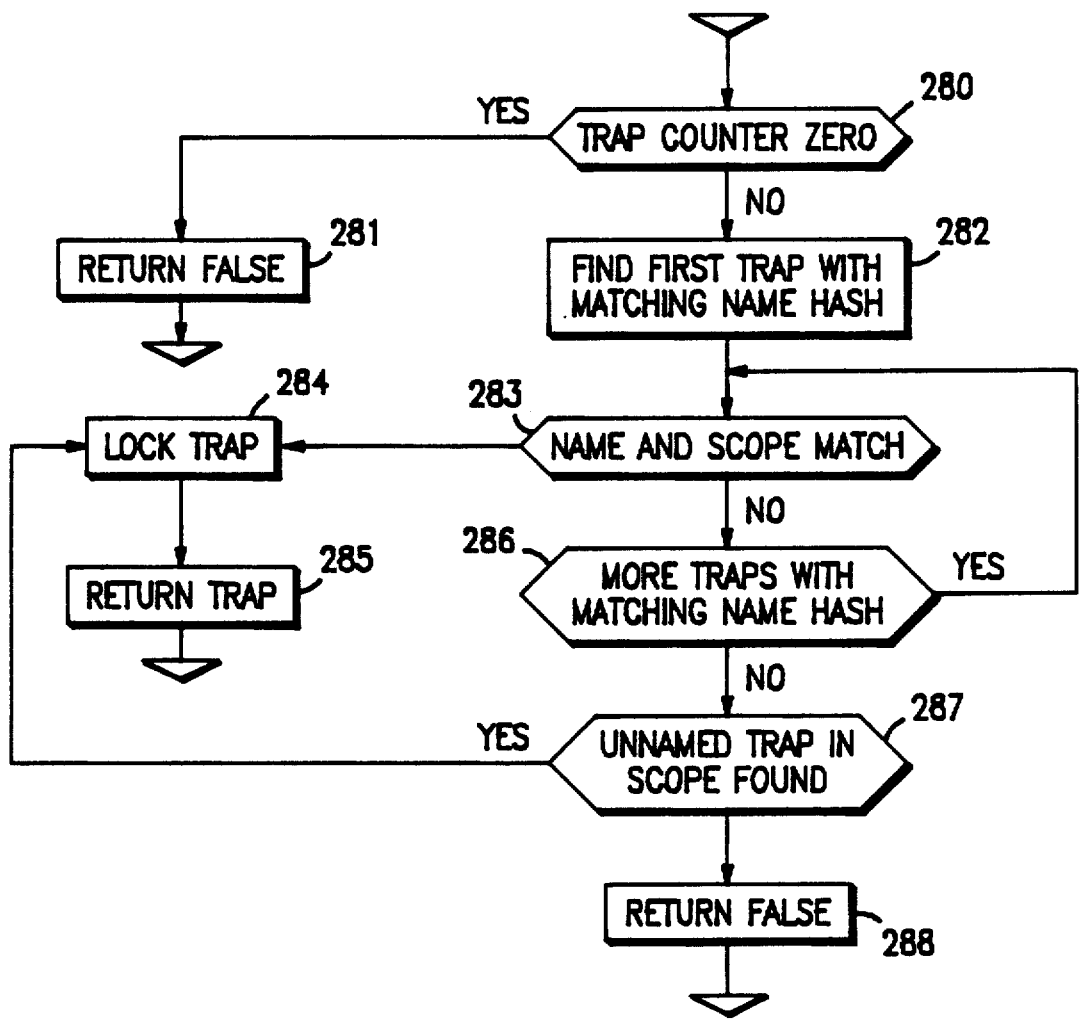
FIG. 12G shows a flowchart illustrating an operation to Check If a Creation Monitor is Set.

FIG. 12G shows a flowchart illustrating an operation to Check If a Creation Monitor is Set. In decision block 280 a check is made to see whether the monitor counter is set to zero; if so the routine passes to block 281 to return a FALSE indication; if not it passes to block 282, where it finds the first monitor with a matching name hash and then proceeds to decision block 283.

In decision block 283 if the name to check is the same as in the monitor and the created process is in the scope of the trap, the routine passes to block 284, where the monitor is locked and then to block 285 to return a TRUE indication; if not it passes to decision block 286. In decision block 286 if there are more monitors with a matching name hash, the routine returns to decision block 283; if not it proceeds to block 287.

In decision block 287 a similar algorithm is used to determine if there is any unnamed creation monitor set such that the new process is in the scope of the monitor; if yes, the routine proceeds to block 288 to return with a FALSE Boolean value, indicating that no creation monitor to resolve has been found.

Figure 12H:
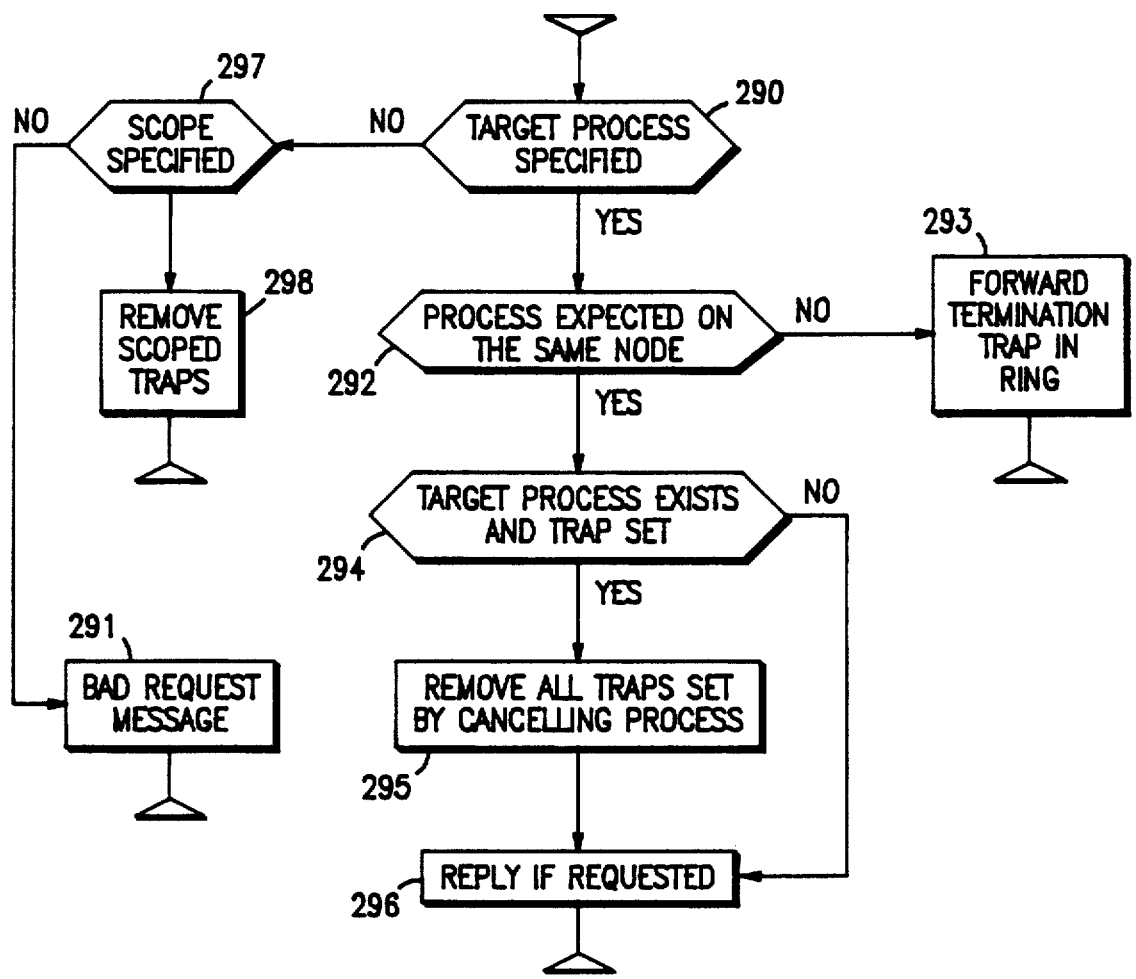
FIG. 12H shows a flowchart illustrating an operation to Cancel a Process Termination Monitor.

FIG. 12H shows a flowchart illustrating an operation to Cancel a Process Termination Monitor. In decision block 290 if a target process is specified, the routine passes to decision block 292; otherwise it passes to block 287, where it checks if a scope is specified in the monitor cancellation request. In decision block 292 if the process is expected on the same node, the routine passes to decision block 294; if not it passes to block 293, where the termination monitor is forwarded in the logical ring and terminated.

In decision block 294 if the target process exists and the monitor is set, the routine passes to block 295, where all monitors set by the cancelling process are removed, and it passes then to block 296, where a reply is generated if it has been requested. In decision block 294 if the conditions are not true, then the routine passes to block 296 and terminates.

In decision block 297, if no cancellation scope is specified either, the request message is rejected as a bad request in block 291; else it proceeds to block 298, where all relevant scoped termination monitors are cancelled using a similar algorithm and the routine exits.

| Correlation of Flowcharts to Program Listing | Line Numbers in Program Listing A |
|---|---|
| Set Process Creation Monitor | |
| Own broadcast received | 73 |
| Check if correct request | 76-82 |
| Check if correct local scope | 91-101 |
| Create monitor data structure | 108-138, 184-185 |
| Insert monitor in named creation trap list | 139-161 |
| Insert monitor in scoped creation trap list | 162-181 |
| Conditional monitor | 191 |
| Process exists already | 192 |
| Resolve creation monitor | 193 |
| Monitor to hold | 194 |
| Node in network | 202 |
| Monitor was broadcasted from another node | 203 |
| Monitor for whole network | 202, 203 |
| Broadcast monitor to all Process Management Processes | 204-208 |
| Set Process Termination Monitor | |
| Check if single target process specified | 236 |
| Check if local process exists | 239 |
| Check if remote process | 241, 271 |
| Forward request in ring | 264, 272 |
| Create termination monitor | 243-251 |
| Link monitor in the target Process Control Block | 253-260 |
| Check if node or group of processes specified | 267, 281 |
| Reject request message | 285 |
| Check if local scope exists | 268, 270 |
| Insert monitor in scoped termination trap list | 269, 282, 290-330 |
| Resolve Process Termination Monitor | |
| Monitor set for terminating process | 968 |
| Reply to monitor request message and free trap | 972-978 |
| More monitors set for terminating process | 970, 971, 979 |
| Clear pointer in the Process Control Block | 981 |
| Resolve scoped termination monitors | 984, 1006 |
| Resolve Process Creation Monitor | |
| Check if monitor in specified scope | 564 |
| Check if monitor to hold | 576 |
| Reply to monitor request | 577-586 |
| Check if monitor was conditional | 571-574, 587 |
| Broadcast creation monitor removal | 590, 613-623 |
| More monitors set on same name or scope | 562, 565, 601, 602 |
| Send notification | 593-596 |
| Check if monitor was conditional | 597 |
| Remove resolved monitor data structures | 604, 605, 685-842 |
| Creation Monitor Resolution from other Nodes | |
| Monitor list for created process name found | 864, 894-914 |
| Monitor is locked (being resolved on the monitor setting node) | 864 |
| Monitor with matching scope | 866-867 |
| Reply to monitor request | 868-873 |
| Broadcast request to remove the monitor | 874, 613-623 |
| More monitors set on same process name | 865, 878-879 |
| Free remote notification and the resolved monitors | 881-885 |
| Cancel Process Creation Monitor | |
| Own broadcast received | 365 |
| Scope of cancel specified | 375 |
| Remote scope | 377, 378 |
| Forward request in logical ring | 379 |
| Correct local scope specified | 377, 383 |
| Search for specified monitor(s) | 399, 441 |
| Monitor found | 441 |
| Monitor on named process | 444 |
| Remove matching named monitors | 445, 446 |
| Remove matching unnamed monitors | 448 |
| Cancel from same node and scope not local | 401 |
| Broadcast cancel request | 402, 404 |
| Reply if requested from same node and free request | 407-424 |
| Check if Creation Monitor Set | |
| Monitor counter zero | 643 |
| Find first monitor with matching name hash | 646-648 |
| Name and scope match | 655-656 |
| Lock monitor (to allow nonresident monitored process creation) | 660, 672 |
| More monitors with matching name hash | 654, 657, 658 |
| Cancel Process Termination Monitors | |
| Target process specified | 475 |
| Process expected on the same node | 477-480 |
| Target process exists and monitor set | 478, 485 |
| Remove all monitors set by cancelling process | 485, 1008-1069 |
| Reply if requested | 486-495 |
| Forward termination monitor in ring | 481 |
| Scope specified | 499 |

It will be apparent to those skilled in the art that the herein disclosed invention may be modified in numerous ways and may assume many embodiments other than the preferred form specifically set out and described above. For example, the invention may be implemented on other types of data processing systems. It may also be used to provide additional attributes regarding created and/or terminated processes, such as whether the process is a context process. Also, it may be used for providing notification of other types of events.

Accordingly, it is intended by the appended claims to cover all modifications of the invention which fall within the true spirit and scope of the invention.

PROGRAM LISTING A

```
 8
 9    Module        : XXX XIX   pm_traps.c
10    Date submitted : XEX XUX
11    Author        : Gabor Simor
12    Origin        : cX
13    Description   : This file contains subroutines to access process
14                    creation and termination traps
15    ------------------------------------------------------------
```

```
*/
#ifndef lint
static char SrcId[] = "%Z% %M%:%I%";
#endif
/*      include header files                                            */ include <os/vers.h>            /* common for the cX project     */ include <cX.h>                 /* common for the cX project     */
include <gen_codes.h>          /* common for the cX project     */ include <os/kerntypes.h>       /* common with the Kernel        */
include <os/cXptemp.h>         /* process template structure    */ include "pmint.h"              /* process management private .h */ include <string.h>

/*************************************************************
        Set Process Creation Trap
*************************************************************/ void pr_setcrtr (handle,pid,size)
MSG_HANDLE *handle;                     /* user request message  */
unsigned long pid;                      /* pid of the user       */
unsigned long size;                     /* request message size  */
{
    extern char *memcpy();
    extern bool samecell();
    extern bool conn_ok();
    extern void remote_conn();
    extern PCB *is_p_name();
    extern short hash();
    extern void resolve_crtrap();
    extern void pm_msg_rej();
    extern void pm_bad_msg();
    extern bool is_ctx();

extern long ctrap_count;            /* nf of active creat'n traps */
    extern CRTRAP *ctrht[];              /* creation trap hash table   */
    extern CRTRAP *crtr_scop;            /* scoped creat trap list ptr */
    extern long this_cell;               /* NULL if no NIM board       */
    extern unsigned long own_pid;        /* pid of "Process_mgt"       */ register char *p_name;               /* proc name to be trapped    */
    register CRTRAP *trap, *t, *t1;
    register char *msg1;                 /* reqmsg dupl for broadcast  */
    short i;                1
    PCB *pcb;                            /* pcb of an existing process */
    MSG_HANDLE brdc_hndl;                /* broadcasted msg handle     */
    CONNECTOR *c;                        /* scope context connector    */
        bool remote;                     /* remote scope context        */

/*
        return if own broadcast or invalid remote request
*/ if (pid == own_pid)
                return;

if ((!samecell(own_pid,pid)) && (!Get_triple(handle,LOCL,_))) {
            pm_bad_msg("invalid rem msg",handle,pid,FALSE);
            return;
            } p_name = Get_triple(handle,NAME,_);
        if (strlen(p_name) > MAXNAM -1) {
            pm_bad_msg("too long name",handle,pid,FALSE);
            return;
            }

/*
        if remote or invalid context scope, don't continue
*/ if (c = (CONNECTOR *) Get_triple(handle,SCOP,_))
            if (CONN_PID(c))
                if (conn_ok(handle,*c,&remote)) {
                    if (remote) {
```

```
                            remote_conn(handle,pid,c,_);
                            return;
                        }
                    else if (!is_ctx(c,handle))
                                            return;
                }
            else
                return;

/*
        insert a new item in the trap link list
*/ if (!(trap = (CRTRAP *) Alloc(sizeof(CRTRAP),FALSE))) {
            pm_msg_rej(handle,NO_CORE,TRUE,TRUE);
            return;
        } trap->call_pid = pid;
        trap->msg = handle->msg_start;

if (p_name)
            strcpy(trap->name,p_name);
        else
            trap->name[0] = '\0';

trap->nxtsame = NULL;
        trap->prvtrap = NULL;
        trap->lock = FALSE;

if (c) {
            trap->scoped = TRUE;
            trap->scope = CONN_PID(c);
            }
        else {
            trap->scoped = FALSE;
            trap->scope = 0;
            } if (Get_triple(handle,HOLD,_))
        trap->hold = TRUE;
    else
        trap->hold = FALSE;

if (p_name) {
        i = hash(p_name);

if ((t = *(ctrht+i)) == NULL)
            *(ctrht+i) = trap;
         else    {
          t1 = t;
          do (
              if(!strcmp(t1->name,p_name)) {
                      while (t1->nxtsame)
                          t1=t1->nxtsame;
                      t1->nxtsame = trap;
                      break;
                      }
              t = t1;
              t1 = t1->nxtrap;
           } while (t1);
          if (!t1) {
              t->nxtrap = trap;
              trap->prvtrap = t;
              }
         }
        }
    else  if (!(t = crtr_scop))
        crtr_scop = trap;
    else {
        t1 = t;
        do (
            if (t1->scope == trap->scope) {
                     while (t1->nxtsame)
                         t1=t1->nxtsame;
                     t1->nxtsame = trap;
                     break;
                     }
```

```
                t = t1;
                t1 = t1->nxtrap;
            } while (t1);

if (!t1) {
                t->nxtrap = trap;
                trap->prvtrap = t;
            }
        } trap->nxtrap = NULL;
    ctrap_count++;

/*
    resolve trap if conditional and existing name found
*/ if (Get_triple(handle,COND,_))
            if (pcb = is_p_name(p_name,trap)) {
                    resolve_crtrap(pcb,trap);
                    if (!trap->hold)
                        return;
                }

/*                    1
        broadcast trap req to ALL "Process_mgt" processes in the network
*/ if (!(Get_triple(handle,LOCL,_)) && (this_cell!=0)    &&
            (!(trap->scoped && (!trap->scope))) && (samecell(pid,own_pid))) {
            msg1 = Makemsg(size,"","");
            memcpy(msg1,handle->msg_start,(int) size);
            Ini_handle(&brdc_hndl,msg1,_,SUSP|NOFIX);
            Add_triple(&brdc_hndl,TRAP,sizeof(CRTRAP),trap);
            Put(ALL,"Process_mgt",brdc_hndl.msg_start);
        }
    }

/**************************************************************
            Set Process Termination Trap
**************************************************************/ void pr_settrtr (handle,pid)
MSG_HANDLE *handle;
unsigned long pid;                      /* pid of the user        */
{
        extern PCB *makepcb();
        extern void pm_msg_rej();
        extern void pm_bad_msg();
        extern void remote_conn();
        extern bool samecell();
        extern bool conn_ok();
        extern void insert_trtr_scop();
        extern bool is_ctx();

extern unsigned long own_pid;

register PCB *pcb;
        register TRTRAP *trap,*t;
        CONNECTOR tpc, *c;                  /* target process connector*/
        bool remote;

if (c = (CONNECTOR *) Get_triple(handle,CONN,_)) { tpc = *c;
           if (!conn_ok(handle,tpc,&remote))
                                    return;
           else if (!remote) { if (!(trap = (TRTRAP *) Alloc(sizeof(TRTRAP),FALSE))) {
                  pm_msg_rej(handle,NO_CORE,TRUE,TRUE);
                  return;
              } trap->call_pid = pid;
              trap->msg = handle->msg_start;
              trap->nxtsame = NULL;
              trap->scoped = FALSE;
```

```
252
253                         pcb = makepcb(tpc.pid);
254                         if (!(t = pcb->termtrap))
255                             pcb->termtrap = trap;
256                         else {
257                             while (t->nxtsame!=NULL)
258                                     t = t->nxtsame;
259                             t->nxtsame = trap;
260                             }
261                         }
262                                 1
263                     else
264                         remote_co )(handle,pid,&tpc,_);
265             }
266
267         else if (c = (CONNECTOR *) Get_triple(handle,SCOP,_))
268             if (!CONN_PID(c))
269                 insert_trtr_scop(handle,pid,c);
270             else if (conn_ok(handle,*c,&remote))
271                 if (remote)
272                     remote_conn(handle,pid,c,_);
273                 else
274                     if (is_ctx(c,handle))
275                         insert_trtr_scop(handle,pid,c);
276                     else
277                         return;
278             else
279                 return;
280
281         else if (Get_triple(handle,LOCL,_))
282                 insert_trtr_scop(handle,pid,(CONNECTOR *) _);
283
284         else {
285             pm_bad_msg("syntax error",handle,pid,FALSE);
286             return;
287             }
288 }
289
290 static void insert_trtr_scop(h,p,c)
291 MSG_HANDLE *h;
292 unsigned long p;
293 CONNECTOR *c;
294 {
295     extern void pm_msg_rej();
296
297     extern TRTRAP *trtr_scop;
298
299     TRTRAP *t, *trap;
300
301     if (!(trap = (TRTRAP *) Alloc(sizeof(TRTRAP),FALSE))) {
302         pm_msg_rej(h,NO_CORE,TRUE,TRUE);
303         return;
304         }
305
306     trap->call_pid = p;
307     trap->msg = h->msg_start;
308
309     if (c) {
310         trap->scoped = TRUE;
311         trap->tpid = CONN_PID(c);
312         }
313     else {
314         trap->scoped = FALSE;
315         trap->tpid = 0;
316         }
317
318     if (Get_triple(h,HOLD,_))
319         trap->hold = TRUE;
320     else
321         trap->hold = FALSE;
322
323     if (!(t = trtr_scop))
324             trtr_scop = trap;
325     else {
326         while (t->nxtsame)
327             t = t->nxtsame;
328         t->nxtsame = trap;
329         }       1
330
```

```
331                 trap->nxtsame = NULL;
332         }
333
334     /****************************************************************
335                 Cancel Creation Trap
336     ****************************************************************
337
338     void pr_cancrtr(h,p)
339     MSG_HANDLE *h;
340     unsigned long p;
341     {
342             extern bool conn_ok();
343             extern void chck_rm_trap();
344             extern bool samecell();
345             extern void pm_rep();
346             extern void remote_conn();
347             extern bool is_ctx();
348             extern char *dupmsg();
349
350             extern unsigned long own_pid;
351
352             char *name;
353             char *msg1;
354             bool remote;
355             bool scoped;
356             bool local;
357             CONNECTOR *c;
358             CONNECTOR scope, *s;
359             MSG_HANDLE brdc_hndl;
360
361     /*
362             return if own broadcast
363     */
364
365             if (p == own_pid)
366                     return;
367
368             name = Get_triple(h,NAME,_);
369
370             if (Get_triple(h,LOCL,_))
371                 local = TRUE;
372             else
373                 local = FALSE;
374
375             if (c = (CONNECTOR *) Get_triple(h,SCOP,_)) {
376                 scoped = TRUE;
377                 if (conn_ok(h,*c,&remote)) {
378                     if (remote) {
379                         remote_conn(h,p,c,_);
380                         return;
381                     }
382                     else {
383                         if (is_ctx(c,h)) {
384                             scope = *c;
385                             s = &scope;
386                         }
387                         else
388                             return;
389                     }
390                 }
391                 else
392                     return;
393             }
394             else {
395                 scoped = FALSE;
396                 s = NULL;
```

```
397          )
398.
399          chck_rm_trap(name,h,scoped,s,p);
400
401          if (!local && (this_cell!=0) && !scoped && (samecell(p,own_pid))) {
402              msg1 = dupmsg(h->msg_start);
403              Ini_handle(&brdc_hndl,msg1,_,SUSP|NOFIX);
404              Put(ALL,"Process_mgt",brdc_hndl.msg_start);
405          )
406
407          Add_triple(h,REQ,strlen("cancel")+1,"cancel");
408          if (samecell(p,own_pid))
409              if (samecell(p,own_pid))
410                  if (Get_triple(h,FND,_))
411                      if (!Get_triple(h,RPLY,_))
412                          Free(h->msg_start);
413                      else {
414                          strcpy(h->msg_start,"done");
415                          pm_rep(h,_);
416                      }
417                  else {
418                      strcpy(h->msg_start,"failed");
419                      pm_rep(h,_);
420                  }
421              else
422                  Free(h->msg_start);
423          else
424              Free(h->msg_start);
425      )
426
427      static void chck_rm_trap(name,h,scoped,scope,canpid)
428      char *name;
429      MSG_HANDLE *h;
430      bool scoped;
431      CONNECTOR *scope;
432      unsigned long canpid;
433      {
434          extern short hash();
435          extern void rm_trap();
436          extern void rm_sc_trap();
437          extern bool crtrap_set();
438
439          CRTRAP *t;
440
441          if (crtrap_set(name,&t,_)) {
442              if (!Get_triple(h,FND,_))
443                  Add_triple(h,FND,_,_);
444              if (name)
445                  rm_trap(t,hash(name),canpid,(CRTRAP *)_,(CRTRAP *)_,
                                                                scoped,scope,h);
447              else
448                  rm_sc_trap(scoped,scope,canpid);
449          )
450      )
451
452      /****************************************************************
453          Cancel Termination Trap
454      ****************************************************************/
455
456      void pr_cantrtr(h,p)
457      MSG_HANDLE *h;
458      unsigned long p;
459      {
460          extern void pm_rep();
461          extern bool free_ttrap();
462          extern void free_sctrtr();
```

```
463             extern bool conn_ok();
464             extern int *pm_chck_triple();
465             extern void pm_bad_msg();
466             extern bool is_ctx();
467
468             extern unsigned long own_pid;
469
470             CONNECTOR *conn;
471             CONNECTOR tpc;                    /* target process connector   */
472             PCB *pcb;
473             bool remote;
474
475             if (conn = (CONNECTOR *) Get_triple(h,CONN,_)) {
476
477                 tpc = *conn;
478                 if (!conn_ok(h,tpc,&remote))
479                                     return;
480                 else if (remote)
481                     remote_conn(h,p,&tpc,_);
482                 else {
483                     pcb = makepcb(CONN_PID(conn));
484
485                     if ((!pcb->termtrap) || (!free_ttrap(pcb,p,h)))
486                         strcpy(h->msg_start,"failed");
487                     else
488                         strcpy(h->msg_start,"done");
489
490                     if ((Get_triple(h,RPLY,_)) || (!strcmp(h->msg_start,"failed"))
491                         Add_triple(h,REQ,strlen("cancel")+1,"cancel");
492                         pm_rep(h,_);
493                         }
494                     else
495                         free(h->msg_start);
496                     }
497             }
498
499             else if (conn = (CONNECTOR *) Get_triple(h,SCOP,_))
500                 if (conn_ok(h,*conn,&remote))
501                     if (remote)
502                         remote_conn(h,p,conn,_);
503                     else
504                         if (is_ctx(conn,h))
505                             free_sctrtr(p,CONN_PID(conn),TRUE,h);
506                         else
507                             return;
508                 else
509                     return;
510
511             else if (Get_triple(h,LOCL,_))
512                 free_sctrtr(p,_,FALSE,h);
513             else
514                 pm_bad_msg("syntax error",h,p,FALSE);
515     }
516
517     /********************************************************************
518     Resolve Process Creation Trap
519     ********************************************************************/
520
521     void resolve_crtrap (pcb,t)
522     PCB *pcb;
523     CRTRAP *t;
524     {
525             extern bool resolve_crtrap1();
526
527             extern CRTRAP *crtr_scop;
528
```

```
529         char name0;
530
531         name0 = t->name[0];
532
533         if (resolve_crtrap1(pcb,t))
534             if ((name0 != '\0') && (crtr_scop))
535                 resolve_crtrap1(pcb,crtr_scop);
536     }
537
538     bool resolve_crtrap1 (pcb,t)
539     PCB *pcb;                           /* PCB of the process being created*/
540     CRTRAP *t;
541     {
542         extern bool samecell();
543         extern bool in_ctx();
544         extern short hash();
545         extern bool crtrap_set();               /* check if trap set        */
546         extern void brdcst_crtr_rm();           /* broadcast crtrap removal*/
547         extern void pm_rep();                   /* standard reply routine  */
548         extern void rm_trap();                  /* remove all traps for prm*/
549
550         extern long this_cell;                  /* NULL if node not in LAN */
551
552         CRTRAP *t1;
553         MSG_HANDLE handle;
554         MSGINFO msginfo;
555         CONNECTOR conn, call_conn;
556         bool one_only;
557
558         t1 = t;
559
560         conn.pid = pcb->pid;
561         conn.channel = 0;
562
563         do {
564             if (t1->scoped && !in_ctx(t1->scope,pcb->pid)) {
565                 t1 = t1->nxtsame;
566                 continue;
567             }
568
569             Msg_info(t1->msg,&msginfo);
570             Ini_handle(&handle,t1->msg,msginfo.size,SUSP|NOFIX);
571             if (Get_triple(&handle,COND,_))
572                             one_only = TRUE;
573             else
574                             one_only = FALSE;
575
576             if (!t1->hold) {
577                 Add_triple(&handle,CONN,sizeof(conn),&conn);
578                 Add_triple(&handle,REQ,strlen("set")+1,"set");
579
580                 if (samecell(t1->call_pid,pcb->pid))
581                         strcpy(handle.msg_start,"done");
582                 else
583                         strcpy(handle.msg_start,"traprep");
584
585                 Alt_triple(&handle,NAME,strlen(pcb->p_name)+1,pcb->p_name);
586                 pm_rep(&handle,_);
587                 if (one_only)
588                         break;
589                 else if ((samecell(t1->call_pid,pcb->pid)) && this_cell)
590                                             brdcst_crtr_rm(t1);
591             }
592             else {
593                 CONN_PID(&call_conn) = t1->call_pid;
594                 Put(DIRECT,&call_conn,Makemsg(100,"done",
```

```
595                                 "conn=#C; name=#s; orig=#s; req=#s",
596                                             &conn,t1->name,MYNAME,"set"));
597                     if (one_only)
598                             break;
599                     }
600
601             t1 = t1->nxtsame;
602             } while (t1);
603
604             rm_trap(t,hash(t->name),(unsigned long)_,(CRTRAP *)_,
605                                     (CRTRAP *)_,FALSE,&conn,(MSG_HANDLE *)_);
606             return(!one_only);
607     }
608
609     /*
610             Broadcast creation trap removal request
611     */
612
613     static void brdcst_crtr_rm(t)
614     CRTRAP *t;
615     {
616             char *m;
617             MSG_HANDLE brdc_hndl;
618
619             m = Makemsg(2*KEYSIZE+sizeof(CRTRAP),"remove crtr","");
620             Ini_handle(&brdc_hndl,m,_,SUSP|NOFIX);
621             Add_triple(&brdc_hndl,TRAP,sizeof(CRTRAP),t);
622             Put(ALL,MYNAME,brdc_hndl.msg_start);
623     }
624
625     /**********************************************************************
626             Check if Creation Trap is Set for a process name
627     **********************************************************************/
628
629     bool crtrap_set (prm,t,pid)
630     char *prm;                              /* process name             */
631     CRTRAP **t;
632     unsigned long pid;                      /* pid of the new process   */
633     {
634             extern short hash();
635             extern bool in_ctx();
636
637             extern CRTRAP *ctrht[];         /* create trap hash table    */
638             extern CRTRAP *crtr_scop;       /* scoped creation trap list ptr */
639             extern long ctrap_count;        /* nr of active creat'n traps */
640
641             int i;
642
643             if (ctrap_count == 0)
644                     return(FALSE);
645
646             if (prm) {
647                i = hash(prm);
648                *t = *(ctrht+i);
649
650     /*
651             check if trap for 'pcb->p_name' has been set and lock it if found
652     */
653
654                while (*t!=NULL) {
655                   if ((strcmp((*t)->name,prm)!=0) ||
656                       (pid && (((*t)->scoped) && (!in_ctx((*t)->scope,pid))))) {
657                           (*t) = (*t)->nxtrap;
658                           continue;
659                           }
660                   (*t)->lock = TRUE;
```

```
                    else
                                tagged = FALSE;

if (h) {
                if (cid = (unsigned long *) Get_triple(h,ID,_))
                                can_id = *cid;
            }
            else
                cid = 0;

found_one = FALSE;
            if (h && (Get_triple(h,Keypack('n','e','x','t'),_)))
                                one_only = TRUE;
            else
                                one_only = FALSE;

do {
                t1 = ti->nxtsame;

if (cid) {
                    Ini_handle(&seth,ti->msg,_,SUSP|FIX);
                    if (sid = (unsigned long *) Get_triple(&seth,ID,_))
                                                set_id = *sid;
                    tr2 = (CRTRAP *) Get_triple(&seth,TRAP,_);
                } if (tagged)
                    Msg_info(ti->msg,&setinfo);

if ( ((((canpid)&&(canpid == ti->call_pid)) || (!canpid))      &&
                     (((tr)&&(tr->msg == ti->msg)&&(tr->call_pid == ti->call_pid))
                                                         || (!tr   ))         &&
                     ((!(tr1 && tr2))                    || ((tr1 && tr2)      &&
                      (tr1->msg == tr2->msg)&&(tr1->call_pid == tr2->call_pid)))&&
                     (((canpid)&&((!scoped)||((scoped)&&(ti->scoped)&&
                         (in_ctx(CONN_PID(scope),ti->scope))))) ||
                      ((!canpid)&&(!(ti->scoped)||((ti->scoped)&&
                         (in_ctx(ti->scope,CONN_PID(scope))))))) &&
                     ((!tagged) || (setinfo.tag == caninfo.tag))      &&
                     ((!cid) || ((sid && (set_id == can_id)))         &&
                     !(one_only && found_one)                         &&
                     !((t->hold) && !h)                               ) { ctrap_count--;
                    found_one = TRUE;

if (h)
                        Free(ti->msg);
                    Free(ti);

if ((prev) && (prev->nxtrap) == ti)
                                                prev->nxtrap = t1;
                    else if (*(ctrht+i) == ti)
                                                *(ctrht + i) = t1;
                    else if (crtr_scop == ti)
                                                crtr_scop = t1;
                    else
                                                t0->nxtsame = t1;
                }
                else {
                    t0 = ti;
                    allremoved = FALSE;
                }

} while (ti = t1);
```

```
793
794         if (allremoved) {
795             if (next!=NULL)
796                 next->prvtrap = prev;
797             if (prev!=NULL)
798                 prev->nxtrap = next;
799             else
800                 *(ctrht+i) = next;
801         }
802  }
803
804
805  static void rm_sc_trap (scoped,scope,canpid)
806  bool scoped;
807  CONNECTOR *scope;
808  unsigned long canpid;                    /* pid requesting cancellation,
                                                NULL if trap resolution    */
809
810  {
811      extern CRTRAP *crtr_scop;
812      extern long ctrap_count;
813
814      CRTRAP *t1, *ti;
815
816      if (ti = crtr_scop) {
817          do {
818              t1 = ti->nxtsame;
819              if ((ti->call_pid == canpid) && ((!scoped) ||
820                  (scoped && (ti->scope == CONN_PID(scope))))) {
821
822                  if (ti == crtr_scop) {
823                      if (t1)
824                          t1->prvtrap = NULL;
825                      crtr_scop = t1;
826                  }
827                  else {
828                      if (t1)
829                          t1->prvtrap = ti->prvtrap;
830                      if (ti->prvtrap)
831                          ti->prvtrap->nxtsame = t1;
832                  }
833
834                  if (canpid)
835                      Free(ti->msg);
836                  Free(ti);
837
838                  ctrap_count--;
839              }
840          } while (ti = t1);
841      }
842  }
843  /******************************************************************
844        Creation Trap Resolution From Other Cells
845   ******************************************************************/
846
847
848  void pr_traprep (handle)
849  MSG_HANDLE *handle;
850  {
851      extern CRTRAP *ctrht[];              /* create trap hash table */
852      extern short hash();
853      extern void brdcst_crtr_rm();
854      extern CRTRAP *fnd_crtrlst();
855
856      register CRTRAP *t, *t0;
857      CONNECTOR *tp;                       /* trapped proc connector */
858      MSG_HANDLE rephndl;                  /* reply message handle   */
```

```
859            MSGINFO msginfo;              /* info on reply message */
860
861            tp = (CONNECTOR *) Get_triple(handle,CONN,_);
862            t0 = (CRTRAP *) Get_triple(handle,TRAP,_);
863
864            if ((t = fnd_crtrlst(Get_triple(handle,NAME,_))) && lt->lock) {
865               do {
866                  if (((lt->scoped)&&(!t0->scoped)) ||
867                     ((t->scoped)&&(t0->scoped)&&(lt->scope)&&(!t0->scope))) {
868                     Msg_info(t->msg,&msginfo);
869                     Ini_handle(&rephndl,t->msg,msginfo.size,SUSP|NOFIX);
870                     Add_triple(&rephndl,CONN,sizeof(*tp),tp);
871                     Add_triple(&rephndl,REQ,strlen("set")+1,"set");
872                     strcpy(rephndl.msg_start,"done");
873                     pm_rep(&rephndl,_);
874                     brdcst_crtr_rm(t);
875                     break;
876                  }
877                  else
878                     t = t->nxtsame;
879               } while (t);
880
881               rm_trap(t1,hash(t0->name),(unsigned long)_,t0,(CRTRAP *)_,
882                               FALSE,(CONNECTOR *)_,(MSG_HANDLE *)_);
883            }
884
885            Free(handle->msg_start);
886            return;
887     }
888
889
890     /*
891             Find process creation traplist for process name
892     */
893
894     static CRTRAP *fnd_crtrlst(p_name)
895     char *p_name;
896     {
897            extern short hash();
898            extern CRTRAP *ctrht[];
899
900            register CRTRAP *t;
901            register short i;
902
903            i = hash(p_name);
904            t = *(ctrht+i);
905
906            while (t!=NULL)
907               if (strcmp(t->name,p_name)) {
908                  t = t->nxtrap;
909                  continue;
910               }
911               else
912                  return(t);
913
914            return(NULL);
915     }
916
917     /*************************************************************
918             Remove Resolved Process Creation Trap
919     *************************************************************
920
921     void pr_crtr_rm(h,p)
922     MSG_HANDLE *h;              1
923     unsigned long p;
924     {
```

```
725      extern void rm_trap();
726      extern short hash();
727      extern CRTRAP *fnd_crtrlst();
728      extern bool samecell();
729
730      extern unsigned long own_pid;
731
732      CRTRAP *t, *t0;
733
734      if (!samecell(own_pid,p)) {
735          t0 = (CRTRAP *) Get_triple(h,TRAP,_);
736          if (t = fnd_crtrlst(t0->name))
737              rm_trap(t,hash(t0->name),(unsigned long) _,(CRTRAP *) _,
938                      t0,FALSE,(CONNECTOR *) _,(MSG_HANDLE *) _);
939      }
940
941      Free(h->msg_start);
942  }
943
944  /*************************************************************
945      Resolve Process Termination Trap
946  *************************************************************/
947
948  void term_trap (pcb)
949  PCB *pcb;
950  {
951      extern bool in_ctx();
952      extern char *dupmsg();
953      extern void free_sctrtr();
954
955      extern TRTRAP *trtr_scop;
956
957      TRTRAP *t, *t1;
958      MSG_HANDLE h;
959      CONNECTOR call_conn, tconn, pcon;
960      bool scop_resolved;
961      MSGINFO msginfo;
962
963      CONN_PID(&tconn)  = pcb->pid;
964      CONN_CHAN(&tconn) = 0;
965      CONN_PID(&pcon)   = pcb->parent->pid;
966      CONN_CHAN(&pcon)  = 0;
967
968      if ((t = pcb->termtrap) != NULL) {
969
970          do {
971              t1 = t->nxtsame;
972              Ini_handle(&h,t->msg,_,SUSP|NOFIX);
973              Add_triple(&h,ORIG,strlen(MYNAME)+1,MYNAME);
974              Add_triple(&h,REQ,strlen("set")+1,"set");
975              Add_triple(&h,PCON,strlen(pcon)+1,&pcon);
976              strcpy(h.msg_start,"done");
977              Reply(h.msg_start,h.msg_start);
978              Free(t);
979          } while (t = t1);
980
981          pcb->termtrap = NULL;
982      }
983
984      t = trtr_scop;
985      scop_resolved = FALSE;
986      while (t) {
987          if ((!t->scoped) || (in_ctx(t->tpid,pcb->pid))) {
988              CONN_PID(&call_conn)  = t->call_pid;
989              CONN_CHAN(&call_conn) = 0;
990              Msg_info(t->msg,&msginfo);
```

```
                    Ini_handle(&h,dupmsg(t->msg),_,SUSP|NOFIX);
                    Add_triple(&h,ORIG,strlen(MYNAME)+1,MYNAME);
                    Add_triple(&h,REQ,strlen("set")+1,"set");
                    Add_triple(&h,CONN,sizeof(tconn),&tconn);
                    Add_triple(&h,PCON,strlen(pcon)+1,&pcon);
                    Msg_parm(h.msg_start,msginfo.tag);
                    strcpy(h.msg_start,"done");
                    Put(DIRECT,&call_conn,h.msg_start);
                    scop_resolved = TRUE;
                }
            t = t->nxtsame;
            } if (scop_resolved)
            free_sctrtr(_,pcb->pid,FALSE,(MSG_HANDLE *)_);
    } static bool free_ttrap (pcb,canpid,h)
    PCB *pcb;
    unsigned long canpid;
    MSG_HANDLE *h;
    {
        TRTRAP *t, *t1, *t0;
        bool tagged;
        unsigned long set_id, *sid;
        unsigned long can_id, *cid;
        MSG_HANDLE seth;
        MSGINFO set_info, can_info;
        bool only_one, found_one;

if (Get_triple(h,TAGD,_)) {
                        tagged = TRUE;
                        Msg_info(h->msg_start,&can_info);
                    }
        else
                        tagged = FALSE;

if (cid = (unsigned long *) Get_triple(h,ID,_))
                        can_id = *cid;

found_one = FALSE;
        if (Get_triple(h,Keypack('n','e','x','t'),_))
                                        only_one = TRUE;
        else
                                        only_one = FALSE;

if ((t = pcb->termtrap) != NULL)
           do {
           t1 = t->nxtsame;

if (cid) {
                   Ini_handle(&seth,t->msg,_,SUSP|FIX);
                   if (sid = (unsigned long *) Get_triple(&seth,ID,_))
                                                        set_id = *sid;
                } if (tagged)
                   Msg_info(t->msg,&set_info);

if ((canpid == t->call_pid)                         &&
                   ((!tagged) || (set_info.tag == can_info.tag))    &&
                   !(found_one && only_one)                         &&
                   ((!cid) || ((sid) && (set_id == can_id))))       {
                   found_one = TRUE;
```

```
                Free(t->msg);
                Free(t);
                if (pcb->termtrap == t)
                    pcb->termtrap = t1;
                else
                    t0->nxtsame = t1;
                }
            else
                t0 = t;

} while (t = t1);

return(found_one);
} static void free_sctrtr(canpid,tpid,scoped,h)
unsigned long canpid;
unsigned long tpid;
bool scoped;
MSG_HANDLE *h;
{
    extern bool in_ctx();
    extern void pm_rep();

extern TRTRAP *trtr_scop;

TRTRAP *t, *t1, *t0;
    bool found;

found = FALSE;
    if ((t = trtr_scop) != NULL)
        do {
            t1 = t->nxtsame;

if (((((canpid) && (canpid==t->call_pid) && (t->scoped==scoped)
                && ((!scoped) || (in_ctx(tpid,t->tpid))))       ||
                ((!canpid) && ((!t->scoped) || (in_ctx(t->tpid,tpid))))) &&
                !(t->hold && (!h)))

Free(t->msg);
                Free(t);
                found = TRUE;
                if (trtr_scop == t)
                    trtr_scop = t1;
                else
                    t0->nxtsame = t1;
                }
            else
                t0 = t;

} while (t = t1);

if ((h) && (Get_triple(h,RPLY,_))) {
        Add_triple(h,REQ,strlen("cancel")+1,"cancel");
        if (found)
            strcpy(h->msg_start,"done");
        else
            strcpy(h->msg_start,"failed");
        pm_rep(h,_);
        } else if (h)
        Free(h->msg_start);
}
```

```
                Check if a string is a process name
        */ static PCB *is_p_name(nm,t)
        char *nm;
        CRTRAP *t;
        {
                extern PCB *makepcb();
                extern PCB *findname();

extern long root[];

PCB *pcb;
                PCB *found_pcb;
                bool one_level;

if (!t->scoped) {
                    one_level = FALSE;
                    pcb = (PCB *) root;
                }
                else if (!t->scope) {
                    one_level = TRUE;
                    pcb = (PCB *) root;
                }
                else {
                    one_level = FALSE;
                    if (!(pcb = makepcb(t->scope)))
                                        return(NULL);
                } found_pcb = findname(nm,pcb->pht,one_level);
                return(found_pcb);
        } static PCB *findname(pnm,pht,one_level)
        char *pnm;
        PCB **pht;
        bool one_level;
        {
                extern short hash();

register PCB *p, *p1;
                register long i;
                short k;

k = hash(pnm);

for (i=PHTSIZE-1; i>=0; i--) {
                    if ((p = *(pht+i)) != NULL) {
                        if (i == k)
                            if(!strcmp(pnm,p->p_name))
                                return(p);
                                if (p->pht!=0)
                            if ((!one_level) && (p1 = findname(pnm,p->pht,FALSE)))
                                                        return(p1);

while ((p=(p->next_hash))!=NULL) {
                                if (i == k)
                                    if(!strcmp(pnm,p->p_name))
                                        return(p);
                                if (p->pht!=0)
                                    if ((!one_level) && (p1 = findname(pnm,p->pht,FALSE)))
                                                        return(p1);
                        }
                    }
                }
```

```
1189
1190        return(NULL);
1191    }
1192
1193    /*
1194        check triple on existence in user request message
1195    */
1196
1197    int *pm_chck_triple(h,key,pid,err_string)
1198    MSG_HANDLE *h;
1199    keyword key;
1200    char *err_string;
1201    unsigned long pid;
1202    {
1203        extern void pm_bad_msg();
1204
1205        int *p;
1206
1207        if (!(p = (int *) Get_triple(h,key,_)))
1208            pm_bad_msg(err_string,h,pid,FALSE);
1209
1210        else if ((key == NAME) && (strlen((char *) (p)) > MAXNAM)) {
1211            pm_bad_msg("too long name",h,pid,FALSE);
1212                return(NULL);
1213            }
1214
1215            return(p);
1216    }
1217
1218    static bool is_ctx(c,h)
1219    CONNECTOR      *c;
1220    MSG_HANDLE *h;
1221    {
1222        extern PCB *makepcb();
1223
1224        PCB *pcb;
1225
1226        pcb = makepcb(CONN_PID(c));
1227        if ((!pcb) || (!(pcb->pht))) {
1228            pm_msg_rej(h,cX_PARAMETER,FALSE,FALSE);
1229            return(FALSE);
1230            }
1231        else
1232            return(TRUE);
1233    }
```

What is claimed is:

1. In a distributed data processing system comprising plurality of interconnected nodes, said system comprising a plurality of processes, said processes communicating with one anther by means of messages, a method of providing a notification message when a process is created on one of said plurality of interconnected nodes comprising the steps of:

a) transmitting a request from a requesting process of a first node to a process manager process of said first node;

b) transmitting said request from said process manager process of said first node to a process manager process of a second node;

c) monitoring said second node for a monitored process being created on said second node;

d) transmitting a notification message from said process manager process of said second node to said process manager process of said first node when said monitored process is created on said second node and prior to said process manager process of said second node receiving a notice from said monitored process of the creation of said monitored process; and e) transmitting a notification message from said process manager process of said first node to said requesting process.

2. The method of providing a notification message recited in claim 1, wherein said request designates said monitored process having a particular name.

3. The method of providing a notification message recited in claim 1, wherein said request originates from a plurality of nodes, and wherein said notification message is transmitted to said plurality of nodes.

4. The method of providing a notification message recited in claim 1, wherein said request may be generated by any one or more of said plurality of processes in said system.

5. The method of providing a notification message recited in claim 4, wherein said request may be canceled by any of said plurality of requesting processes in said system.

6. The method of providing a notification message recited in claim 1, wherein said request causes said process manager process of said second node to set a process creation trap, which trap is resolved when a process is created which satisfies the request.

7. The method of providing a notification message recited in claim 6, wherein said process manager process is requested to cancel said process creation monitor.

8. The method of providing a notification message recited in claim 6, wherein said request causes said process manager process to set a process creation monitor only upon the condition that a designated process does not already exist.

9. The method of providing a notification message recited in claim 8, wherein said process creation monitor may be set regarding the entire system, one node, or a group of related processes.

10. In a distributed data processing system comprising a plurality of interconnected nodes, said system comprising a plurality of processes, said processes communicating with one another by means of messages, a method of providing a notification message when a process is terminated on one of said plurality of interconnected nodes comprising the steps of:

a) transmitting a request from a requesting process of a first node to a process manager process of said first node; p1 b) transmitting said request from said process manager process of said first node to a process manager process of a second node;

c) monitoring said second node for a monitored process being terminated on said second node;

d) transmitting a notification message from said process manager process of said second node to said process manager process of said first node when said monitored process is terminated on said second node and prior to said process manager process of said second node receiving a notice from said monitored process of the termination of said monitored process; and e) transmitting a notification message from said process manager process of said first node to said requesting process.

11. The method of providing a notification message recited in claim 10, wherein said request designates a particular process.

12. The method of providing a notification message recited in claim 10, wherein said request originates from a plurality of nodes, and wherein said notification message is transmitted to said plurality of nodes.

13. The method of providing a notification message recited in claim 10, wherein said request may be generated by any one or more of said plurality of processes in said system.

14. The method of providing a notification message recited in claim 13, wherein said request may be canceled by any of said plurality of requesting processes in said system.

15. The method of providing a notification message recited in claim 10, wherein said request causes said process manager process of said second node to set a process termination trap, which trap is resolved when a process is terminated on said second node.

16. The method of providing a notification message recited in claim 15, wherein said process manager process is requested to cancel said process termination monitor.

17. The method of providing a notification message recited in claim 15, wherein said process termination monitor may be set regarding one node or a group of related processes.

18. The method of providing a notification message recited in claim 1, wherein said request designates a process created within an identified group of processes on said second node.

19. The method of providing a notification message recited in claim 1, wherein said request is generated by a process on said first node, and wherein said notification message is transmitted to said requesting process within said first node.

20. The method of providing a notification message recited in claim 1, wherein said request is generated by a process within the same identified group of processes as said created process, and wherein said notification message is transmitted to said requesting process within said identified group of processes.

21. The method of providing a notification message recited in claim 10, wherein said request designates a process terminated within an identified group of processes on said second node.

22. The method of providing a notification message recited in claim 10, wherein said request is generated by a process on said first node, and wherein said notification message is transmitted to said requesting process within said first node.

23. The method of providing a notification message recited in claim 10, wherein said request is generated by a process within the same identified group of processes as said terminated process, and wherein said notification message is transmitted to said requesting process within said identified group of processes.

24. In a distributed data processing system comprising a plurality of interconnected nodes, said system comprising a plurality of processes, said processes communicating with one another by means of messages, a method of providing a notification message when a process is created on one of said plurality of interconnected nodes comprising the steps of:

a) transmitting a request from a requesting process of a first node to a process manager process of said first node;

b) transmitting said request from said process manager process of said first node to a process manager process of each of a plurality of second nodes;

c) monitoring said second nodes for a monitored process being created on any of said plurality of second nodes;
d) transmitting a notification message from said process manager process of a particular node of said plurality of second nodes to said process manager process of said first node when said monitored process is created on any of said plurality of second nodes and prior to said process manager process of said particular node receiving a notice from said monitored process of the creation of said monitored process;
e) transmitting a notification message from said process manager process of said first node to said requesting process; and
f) transmitting a notification message from said process manager process of said first node to said process manager processes of each of said plurality of second nodes.

25. In a distributed data processing system comprising a plurality of interconnected nodes, said system comprising a plurality of processes, said processes communicating with one another by means of messages, a method of providing a notification message when a process is terminated on one of said plurality of interconnected nodes comprising the steps of:

a) transmitting a request from a requesting process of a first node to a process manager process of said first node;
b) transmitting said request from said process manager process of said first node to a process manager process of each of a plurality of second nodes;
c) monitoring said second nodes for a monitored process being terminated on any of said plurality of second nodes;
d) transmitting a notification message from said process manager process of a particular node of said plurality of second nodes to said process manager process of said first node when said monitored process is terminated on any of said plurality of second nodes and prior to said process manager process of said particular node receiving a notice from said monitored process of the termination of said monitored process;
e) transmitting a notification message from said process manager process of said first node to said requesting process; and
f) transmitting a notification message from said process manager process of said first node to said process manager processes of each of said plurality of second nodes.

* * * * *